(12) United States Patent
Steiner

(10) Patent No.: US 8,760,293 B2
(45) Date of Patent: Jun. 24, 2014

(54) WIRELESS SENSOR HAVING A VARIABLE TRANSMISSION RATE

(75) Inventor: James P. Steiner, Royersford, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 278 days.

(21) Appl. No.: 13/362,391

(22) Filed: Jan. 31, 2012

(65) Prior Publication Data

US 2012/0133287 A1    May 31, 2012

Related U.S. Application Data

(63) Continuation-in-part of application No. 12/727,956, filed on Mar. 19, 2010, now Pat. No. 8,451,116.

(60) Provisional application No. 61/164,098, filed on Mar. 27, 2009, provisional application No. 61/174,322, filed on Apr. 30, 2009, provisional application No. 61/285,628, filed on Dec. 11, 2009.

(51) Int. Cl.
   *G08B 13/08* (2006.01)

(52) U.S. Cl.
   USPC ............ 340/545.3; 340/538.15; 340/555; 340/567; 315/294; 315/297; 315/308; 250/205

(58) Field of Classification Search
   CPC ......... G01J 1/02; G01J 1/0219; G01J 1/0228; G01J 1/0247; G01J 1/16; G01J 1/32; G01J 1/44; H02B 37/0218; Y02B 20/46
   USPC ......... 315/294–297, 307, 312, 316, 308, 361; 340/538.15, 539.1, 545.3, 540, 552, 340/555, 567, 600; 250/205
   See application file for complete search history.

(56) References Cited

U.S. PATENT DOCUMENTS

| 4,233,545 A | 11/1980 | Webster et al. |
| 4,737,867 A | 4/1988 | Ishikawa et al. |

(Continued)

FOREIGN PATENT DOCUMENTS

| WO | WO 03/043385 | 5/2003 |
| WO | WO 2010/010491 | 1/2010 |

OTHER PUBLICATIONS

Somfy Systems, Inc., Sunis Indoor Wirefree RTS Sun Sensor Brochure, Feb. 2009, 2 pages.

(Continued)

*Primary Examiner* — Haiss Philogene
(74) *Attorney, Agent, or Firm* — Mark E. Rose; Philip N. Smith; Bridget L. McDonough

(57) ABSTRACT

A sensing device transmits wireless signals when an error between at least one sampled parameter value and at least one predicted parameter value is too great, such that the sensing device transmits wireless signals to a load control device using a variable transmission rate that is dependent upon the amount of change in a value of the parameter. The sensing device uses the one or more estimators to determine the predicted parameter value, and may transmit the estimators to the load control device if the error is too great. The load control device uses the estimators to determine at least one estimated parameter value and controls the electrical load in response to the estimated parameter value. The sensing device may comprise, for example, a daylight sensor for measuring a total light intensity in the space around the sensor or a temperature sensor for measuring a temperature around the sensor.

40 Claims, 24 Drawing Sheets

(56) References Cited

U.S. PATENT DOCUMENTS

| | | |
|---|---|---|
| 5,736,965 A | 4/1998 | Mosebrook et al. |
| 5,838,226 A | 11/1998 | Houggy et al. |
| 5,848,054 A | 12/1998 | Mosebrook et al. |
| 5,905,442 A | 5/1999 | Mosebrook et al. |
| 5,962,989 A | 10/1999 | Baker |
| 5,982,103 A | 11/1999 | Mosebrook et al. |
| 6,583,573 B2 | 6/2003 | Bierman |
| 6,687,487 B1 | 2/2004 | Mosebrook et al. |
| 6,803,728 B2 | 10/2004 | Balasubramaniam et al. |
| 7,024,119 B1 | 4/2006 | Mier-Langner et al. |
| 7,027,736 B1 | 4/2006 | Mier-Langner et al. |
| 7,045,968 B1 | 5/2006 | Bierman et al. |
| 7,111,952 B2 | 9/2006 | Veskovic |
| 7,190,126 B1 | 3/2007 | Paton |
| 7,193,201 B2 | 3/2007 | Motte |
| 7,211,968 B2 | 5/2007 | Adamson et al. |
| 7,277,930 B2 | 10/2007 | Hillis et al. |
| 7,369,060 B2 | 5/2008 | Veskovic et al. |
| 7,573,208 B2 | 8/2009 | Newman, Jr. |
| 7,646,029 B2 | 1/2010 | Mueller et al. |
| 7,940,167 B2 | 5/2011 | Steiner et al. |
| 8,009,042 B2 | 8/2011 | Steiner et al. |
| 8,033,686 B2 | 10/2011 | Recker et al. |
| 8,199,010 B2 | 6/2012 | Sloan et al. |
| 8,228,184 B2 | 7/2012 | Blakeley et al. |
| 8,410,706 B2 | 4/2013 | Steiner et al. |
| 8,451,116 B2 | 5/2013 | Steiner et al. |
| 2003/0178554 A1 | 9/2003 | Zak |
| 2004/0071471 A1 | 4/2004 | Baker et al. |
| 2005/0110416 A1 | 5/2005 | Veskovic |
| 2006/0091822 A1 | 5/2006 | Bierman et al. |
| 2008/0017726 A1 | 1/2008 | Neumann |
| 2008/0111491 A1 | 5/2008 | Spira |
| 2008/0291006 A1 | 11/2008 | Kang et al. |
| 2009/0206983 A1 | 8/2009 | Knode et al. |
| 2009/0251352 A1 | 10/2009 | Altonen et al. |
| 2010/0052574 A1 | 3/2010 | Blakeley et al. |
| 2010/0052576 A1 | 3/2010 | Steiner et al. |
| 2010/0052894 A1 | 3/2010 | Steiner et al. |
| 2010/0207759 A1 | 8/2010 | Sloan et al. |
| 2010/0244706 A1 | 9/2010 | Steiner et al. |
| 2012/0091213 A1 | 4/2012 | Altonen et al. |
| 2012/0281606 A1 * | 11/2012 | Cooney et al. ................ 370/311 |
| 2013/0234008 A1 * | 9/2013 | Steiner ...................... 250/214.1 |

OTHER PUBLICATIONS

Somfy Systems, Inc., Sunis Wirefree RTS Light Sensor Programming/Operating/Installation Instructions, Feb. 2009, 4 pages.

Pape, Scott, "How to extend the battery life of your microcontroller based design", Jul. 26, 2006, 5 pages, XP002611416, [retrieved on Nov. 25, 2010], retrieved from the Internet <URL: http://www.eetimes.com/design/other/4006683/ContenrItem_D4D08059_689F_44CE_8854_56483005185A>.

European Patent Office, International Search Report and Written Opinion for International Patent Application No. PCT/US2010/028298, Dec. 13, 2010, 19 pages.

* cited by examiner

WIRELESS SENSOR HAVING A VARIABLE TRANSMISSION RATE

CROSS-REFERENCE TO RELATED APPLICATIONS

This application is a continuation-in-part application of commonly-assigned, co-pending U.S. patent application Ser. No. 12/727,956, filed Mar. 19, 2010, entitled WIRELESS BATTERY-POWERED DAYLIGHT SENSOR, which is a non-provisional application of commonly-assigned U.S. Provisional Application Ser. No. 61/164,098, filed Mar. 27, 2009, entitled METHOD OF CALIBRATING A DAYLIGHT SENSOR; U.S. Provisional Application Ser. No. 61/174,322, filed Apr. 30, 2009, entitled WIRELESS BATTERY-POWERED DAYLIGHT SENSOR; and U.S. Provisional Application Ser. No. 61/285,628, filed Dec. 11, 2009, entitled WIRELESS BATTERY-POWERED DAYLIGHT SENSOR; the entire disclosures of which are hereby incorporated by reference.

BACKGROUND OF THE INVENTION

1. Field of the Invention

The present invention relates to sensors for measuring parameters, and more particularly, to a load control system having a load control device (such as, a dimmer switch or a temperature control device) and a wireless sensing device (such as, a daylight sensor or a temperature sensor).

2. Description of the Related Art

Some load control systems allow for the control of one or more electrical loads in response to a parameter measured by a sensing device. Daylight sensors (i.e., photosensors) are often used to measure the total light intensity in a space of a building that is illuminated by both artificial light from a lighting load (such as an incandescent lamp or a fluorescent lamp) and daylight (i.e., sunlight) shining through a window, such that the light intensity of the lighting load may be controlled to adjust the total light intensity in the space. For example, a lighting control device may decrease the light intensity of the lighting load as the total light intensity increases, and vice versa. Daylight sensors are typically mounted to a ceiling in the space at a distance from the window. In addition, some load control systems include temperature control devices that are coupled to a heating, ventilation, and air conditioning system (HVAC) system for controlling a present temperature in a space of the building to a setpoint temperature. The temperature control devices may include internal temperature sensing circuits for determining the present temperature in the space or may determine the present temperature in response to one or more remotely-located temperature sensors.

In prior art load control systems, it was typically necessary to electrically couple the sensors to the respective load control devices via electrical wires (for power and communication). However, it is typically not desirable to locate the daylight or temperature sensors next to the pre-existing electrical wires or to run additional electrical wires between the sensors and the respective load control devices, especially, in retro-fit installations. As a result, some load control systems include "wireless" daylight and temperature sensors that may be battery-powered and may transmit digital messages using a wireless medium, such as, for example, radio-frequency (RF) signals.

Since the transmission of RF signals typically consumes a large amount of power, the lifetime of the batteries of the sensors is a function of the number of times that the sensors transmit digital messages, and thus can be greatly shortened if the sensors transmit digital messages too often. Therefore, there is a need for battery-powered sensors that have an acceptable battery life and are able to communicate wirelessly with other control devices of the load control system.

SUMMARY OF THE INVENTION

According to an embodiment of the present invention, a sensor for measuring a parameter transmits wireless signals when an error between at least one sampled parameter value and at least one predicted parameter value is too great, such that the sensor transmits wireless signals using a variable transmission rate that is dependent upon the amount of change in a value of the parameter. The sensor comprises a sensing circuit operable to generate a control signal representative of the value of the parameter, a wireless transmitter for transmitting wireless signals, and a controller coupled to the sensing circuit and the wireless transmitter and operable to periodically sample the control signal to generate the at least one sampled parameter value. The controller is operable to determine the at least one predicted parameter value, to calculate the error using the at least one sampled parameter value and the at least one predicted parameter value, and to transmit a digital message via the wireless signals if the error is too great. The sensor may comprise, for example, a daylight sensor for measuring a total light intensity in the space around the sensor or a temperature sensor for measuring a temperature around the sensor.

According to another embodiment of the present invention, a load control device, which is part of in a load control system having a sensor for measuring a parameter, controls an electrical load in response to at least one estimated parameter value. The load control device comprises a controller for controlling the electrical load, and a wireless receiver for receiving wireless signals from the sensor. The controller is operable to decode a present value of the parameter and one or more estimators from the wireless signals received from the sensor, to determine the at least one estimated parameter value using the present value of the parameter and the estimators, and to control the electrical load in response to the at least one estimated parameter value.

In addition, a load control system for controlling an electrical load located in a space of a building is also described herein. The load control system comprises load control device for controlling an electrical load and a sensor for measuring a parameter. The sensor transmits wireless signals to the load control device in response to the parameter, and controls the electrical load in response to the wireless signals received from the sensor. The sensor determines a first predicted value of the parameter, calculates an error using a present value of the parameter and the first predicted value of the parameter, and transmits wireless signals to the load control device if the error is too great.

According to another embodiment of the present invention, a method of transmitting a digital message in response to a value of a parameter comprises: (1) generating a control signal representative of the value of the parameter; (2) periodically sampling the control signal to generate at least one sampled parameter value; (3) determining at least one predicted parameter value; (4) calculating an error using the at least one sampled parameter value and the at least one predicted parameter value; and (5) transmitting a wireless signal if the error is too great.

Other features and advantages of the present invention will become apparent from the following description of the invention that refers to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

Figure 1:
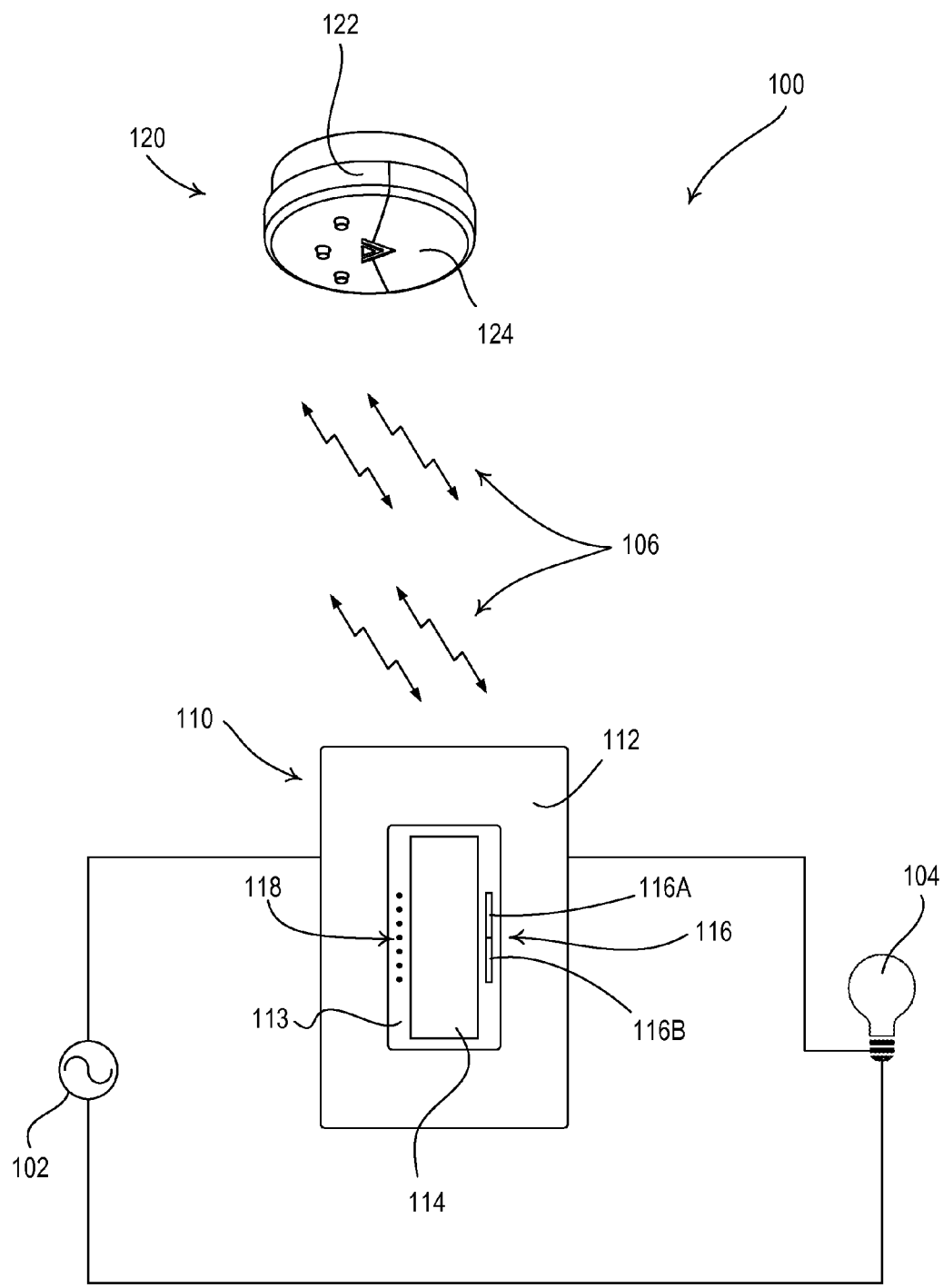
FIG. 1 is a simple diagram of a radio-frequency (RF) lighting control system comprising a dimmer switch and a daylight sensor according to the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simple diagram of a radio-frequency (RF) lighting control system 100 comprising a dimmer switch 110 and a sensing device, e.g., a daylight sensor 120, according to a first embodiment of the present invention. The dimmer switch 110 is adapted to be coupled in series electrical connection between an alternating-current (AC) power source 102 and a lighting load 104 for controlling the amount of power delivered to the lighting load. The dimmer switch 110 may be wall-mounted in a standard electrical wallbox. Alternatively, the dimmer switch 110 could be implemented as a table-top load control device. The dimmer switch 110 comprises a faceplate 112 and a bezel 113 received in an opening of the faceplate. The dimmer switch 110 further comprises a control actuator 114 (i.e., a button) and an intensity adjustment actuator 116. Successive actuations of the toggle actuator 114 toggle, i.e., turn off and on, the lighting load 104. Actuations of an upper portion 116A or a lower portion 116B of the intensity adjustment actuator 116 respectively increase or decrease the amount of power delivered to the lighting load 104 and thus increase or decrease a present light intensity $L_{PRES}$ of the lighting load 104 from a minimum intensity (e.g., 1%) to a maximum intensity (e.g., 100%). A plurality of visual indicators 118, e.g., light-emitting diodes (LEDs), are arranged in a linear array on the left side of the bezel 113. The visual indicators 118 are illuminated to provide feedback of the intensity of the lighting load 104. An example of a dimmer switch having a toggle actuator 114 and an intensity adjustment actuator 116 is described in greater detail in U.S. Pat. No. 5,248,919, issued Sep. 29, 1993, entitled LIGHTING CONTROL DEVICE, the entire disclosure of which is hereby incorporated by reference.

The daylight sensor 120 is mounted so as to measure a parameter, e.g., a total light intensity $L_{T\text{-}SNSR}$ in the space around the daylight sensor (i.e., in the vicinity of the lighting load 104 controlled by the dimmer switch 110). The daylight sensor 120 includes an internal photosensitive circuit, e.g., a photosensitive diode 232 (FIG. 6A), which is housed in an enclosure 122 having a lens 124 for conducting light from outside the daylight sensor towards the internal photosensitive diode 232. The daylight sensor 120 is responsive to the total light intensity $L_{T\text{-}SNSR}$ measured by the internal photosensitive circuit. Specifically, the daylight sensor 120 is operable to wirelessly transmit digital messages (i.e., wireless signals) to the dimmer switch 110 via RF signals 106, such that the dimmer switch 110 controls the present light intensity $L_{PRES}$ of the lighting load 104 in response to the total light intensity $L_{T\text{-}SNSR}$ measured by the daylight sensor 120.

During a setup procedure of the RF lighting control system 100, the daylight sensor 120 may be assigned to (i.e., associated with) the dimmer switch 110. As mentioned above, the daylight sensor 120 transmits digital messages wirelessly via the RF signals 106 to the dimmer switch 110 in response to the total light intensity $L_{T\text{-}SNSR}$ measured by the daylight sensor. A digital message transmitted by the daylight sensor 120 includes, for example, identifying information, such as, a serial number (i.e., a unique identifier) associated with the daylight sensor. The dimmer switch 110 is responsive to messages containing the serial numbers of the daylight sensor 120 to which the dimmer switch is assigned. Each digital message may further comprise a value representative of the measured total light intensity $L_{T\text{-}SNSR}$ measured by the daylight sensor 120 (e.g., in foot-candles). Accordingly, the dimmer switch 110 controls the present light intensity $L_{PRES}$ of the lighting load 104 in response to receiving a digital message with the total light intensity $L_{T\text{-}SNSR}$ as measured by the daylight sensor 120. According to the present invention, the daylight sensor 120 is operable to transmit digital messages to the dimmer switch 110 using a variable transmission rate $f_{TX}$ that is dependent upon the measured total light intensity $L_{T\text{-}SNSR}$, such that the daylight sensor 120 only transmits digital messages when needed (as will be described in greater detail below).

Examples of RF lighting control systems are described in greater detail in U.S. patent application Ser. No. 12/033,223, filed Feb. 19, 2008, entitled COMMUNICATION PROTOCOL FOR A RADIO-FREQUENCY LOAD CONTROL SYSTEM; U.S. patent application Ser. No. 12/203,518, filed Sep. 3, 2008, entitled RADIO-FREQUENCY LIGHTING CONTROL SYSTEM WITH OCCUPANCY SENSING; U.S. patent application Ser. No. 12/203,500, filed Sep. 3, 2008, entitled BATTERY-POWERED OCCUPANCY SENSOR; and U.S. patent application Ser. No. 12/371,027, filed Feb. 13, 2009, entitled METHOD AND APPARATUS FOR CONFIGURING A WIRELESS SENSOR, the entire disclosures of which are hereby incorporated by reference.

Alternatively, the dimmer switch 110 could be replaced with an electronic switch comprising, for example, a relay, for simply toggling the lighting load 104 on and off. The electronic switch could be adapted to simply turn the lighting load 104 on when the measured total light intensity $L_{T\text{-}SNSR}$ drops below a predetermined threshold and turn the lighting load off when the measured total light intensity $L_{T\text{-}SNSR}$ rises above approximately the predetermined threshold (e.g., using some hysteresis).

The lighting control system 100 could additionally comprise one or more motorized window treatments, such as roller shades, draperies, Roman shades, or blinds, for controlling the amount of daylight entering the space around the daylight sensor 120. Examples of load control systems having motorized window treatments are described in greater detail in U.S. Pat. No. 7,111,952, issued Sep. 26, 2006, entitled SYSTEM TO CONTROL DAYLIGHT AND ARTIFICIAL ILLUMINATION AND SUN GLARE IN A SPACE, the entire disclosure of which is hereby incorporated by reference.

Figure 2:
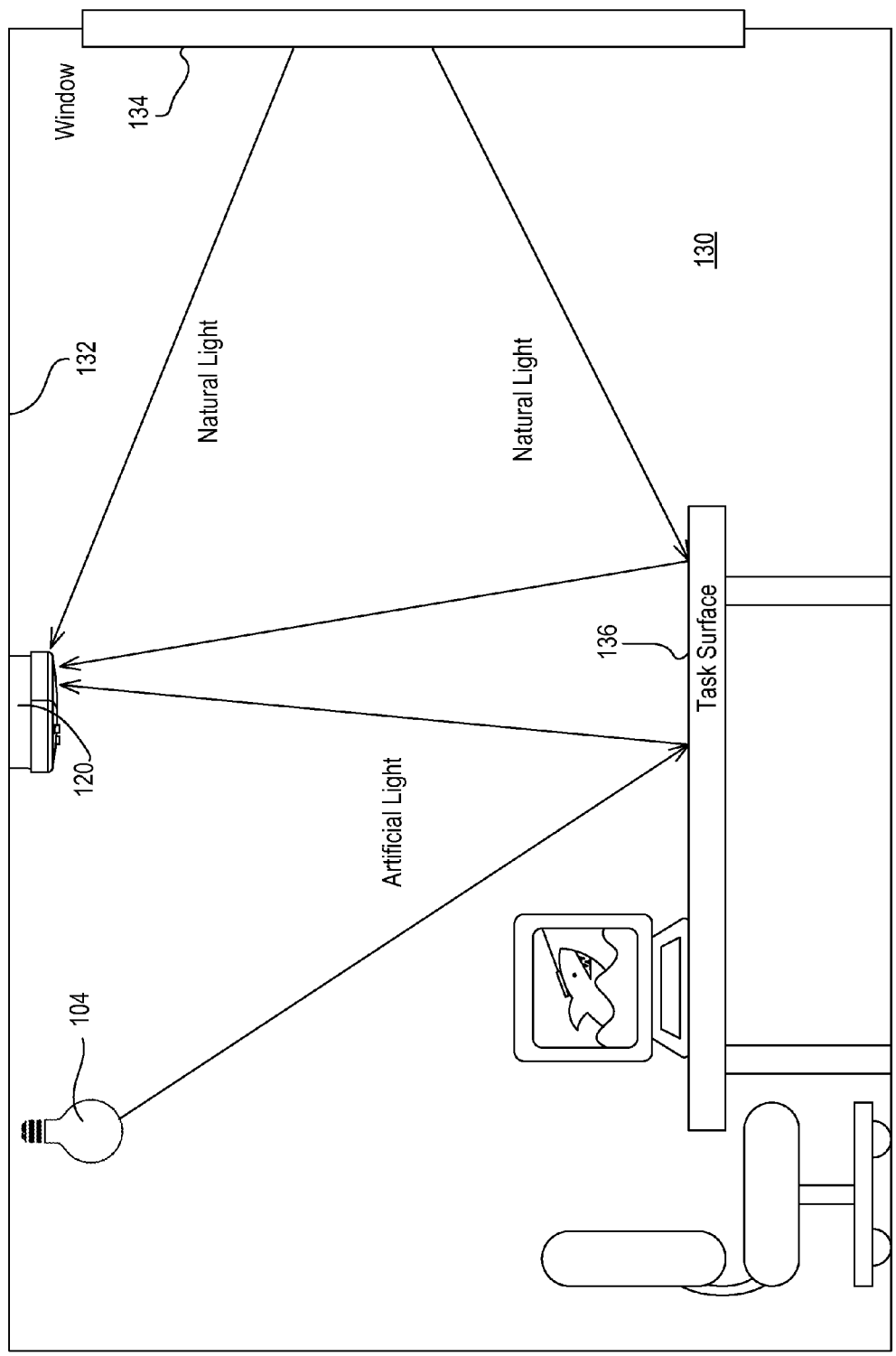
FIG. 2 is a simplified diagram of a room in which the daylight sensor of FIG. 1 may be mounted.

FIG. 2 is a simplified diagram of a room 130 in which the daylight sensor 120 may be mounted. The daylight sensor 120 is mounted to a ceiling 132 of the room 130 at a distance from a window 134 through which natural light (i.e., daylight) shines. The lighting load 104 is also mounted to the ceiling 132 of the room. The room 130 contains a task surface 136 (e.g., a table) that is illuminated by the natural light shining through the window 134 and the electric light (i.e., artificial light) generated by the lighting load 104. Thus, a total light intensity $L_{T\text{-}TASK}$ produced on the task surface 136 is the sum of a light intensity $L_{D\text{-}TASK}$ on the task surface from only daylight entering the room 130 through the window 134 and a light intensity $L_{E\text{-}TASK}$ on the task surface from only the lighting load 104 (i.e., $L_{T\text{-}TASK}=L_{D\text{-}TASK}+L_{E\text{-}TASK}$). The daylight sensor 120 is operable to measure the total light intensity $L_{T\text{-}SNSR}$ at the daylight sensor, which is also a combination of the natural light and the electric light in the room 130. The natural and electric light that shine onto the task surface 136 may be reflected to the daylight sensor 120, while the natural light from the window 134 may shine directly onto the daylight sensor. Thus, the total light intensity $L_{T\text{-}SNSR}$ measured by the daylight sensor 120 is the sum of a light intensity $L_{D\text{-}SNSR}$ at the daylight sensor from only daylight entering the room 130 through the window 134 and a light intensity $L_{E\text{-}SNSR}$ at the daylight sensor from only the lighting load 104 (i.e., $L_{T\text{-}SNSR}=L_{D\text{-}SNSR}+L_{E\text{-}SNSR}$).

The dimmer switch 110 adjusts the present light intensity $L_{PRES}$ of the lighting load 104 so as to control the total light intensity $L_{T\text{-}TASK}$ on the task surface 136 towards a target total task surface light intensity $L_{TRGT\text{-}TASK}$. For example, the target total task surface light intensity $L_{TRGT\text{-}TASK}$ may be preset to be approximately fifty foot-candles. In addition, the target total task surface light intensity $L_{TRGT\text{-}TASK}$ may be decreased by actuating the intensity adjustment actuator 116. Alternatively, the dimmer switch 110 could be operable to receive one or more digital messages from an advanced programming device, such as a personal digital assistant (PDA) or a personal computer (PC), such that the target total task surface light intensity $L_{TRGT\text{-}TASK}$ may be entered using a graphical user interface (GUI) and transmitted to the dimmer switch 110. Further, the target total task surface light intensity $L_{TRGT\text{-}TASK}$ could alternatively be adjusted using an advanced programming mode of the dimmer switch 110. An example of an advanced programming mode for a dimmer switch is described in greater detail in U.S. Pat. No. 7,190,125, issued Mar. 13, 2007, entitled PROGRAMMABLE WALLBOX DIMMER, the entire disclosure of which is hereby incorporated by reference.

Since the total light intensity $L_{T\text{-}SNSR}$ measured by the daylight sensor 120 (e.g., as reflected on the daylight sensor) is less than the total light intensity $L_{T\text{-}TASK}$ shining directly on the task surface 136, the lighting control system 100 is characterized by one or more gains. Specifically, the dimmer switch 110 uses a daylight gain $G_D$ and an electrical light gain $G_E$ to control the present intensity $L_{PRES}$ of the lighting load 104. The daylight gain $G_D$ is representative of the ratio between the light intensity $L_{D\text{-}TASK}$ on the task surface 136 from only daylight and the light intensity $L_{D\text{-}SNSR}$ measured by the daylight sensor 120 from only daylight (i.e., $G_D = L_{D\text{-}TASK}/L_{D\text{-}SNSR}$). The electric light gain $G_E$ is representative of the ratio between the light intensity $L_{E\text{-}TASK}$ on the task surface 136 from only the lighting load 104 and the light intensity $L_{E\text{-}SNSR}$ measured by the daylight sensor 120 from only the lighting load (i.e., $G_E = L_{E\text{-}TASK}/L_{E\text{-}SNSR}$). The daylight gain $G_D$ and the electrical light gain $G_E$ of the lighting control system 100 are set during a gain calibration procedure. An example of a gain calibration procedures are described in greater detail in commonly-assigned, co-pending U.S. patent application Ser. No. 12/727,923, filed Mar. 19, 2010, entitled METHOD OF CALIBRATING A DAYLIGHT SENSOR, the entire disclosure of which is hereby incorporated by reference.

Figure 3:
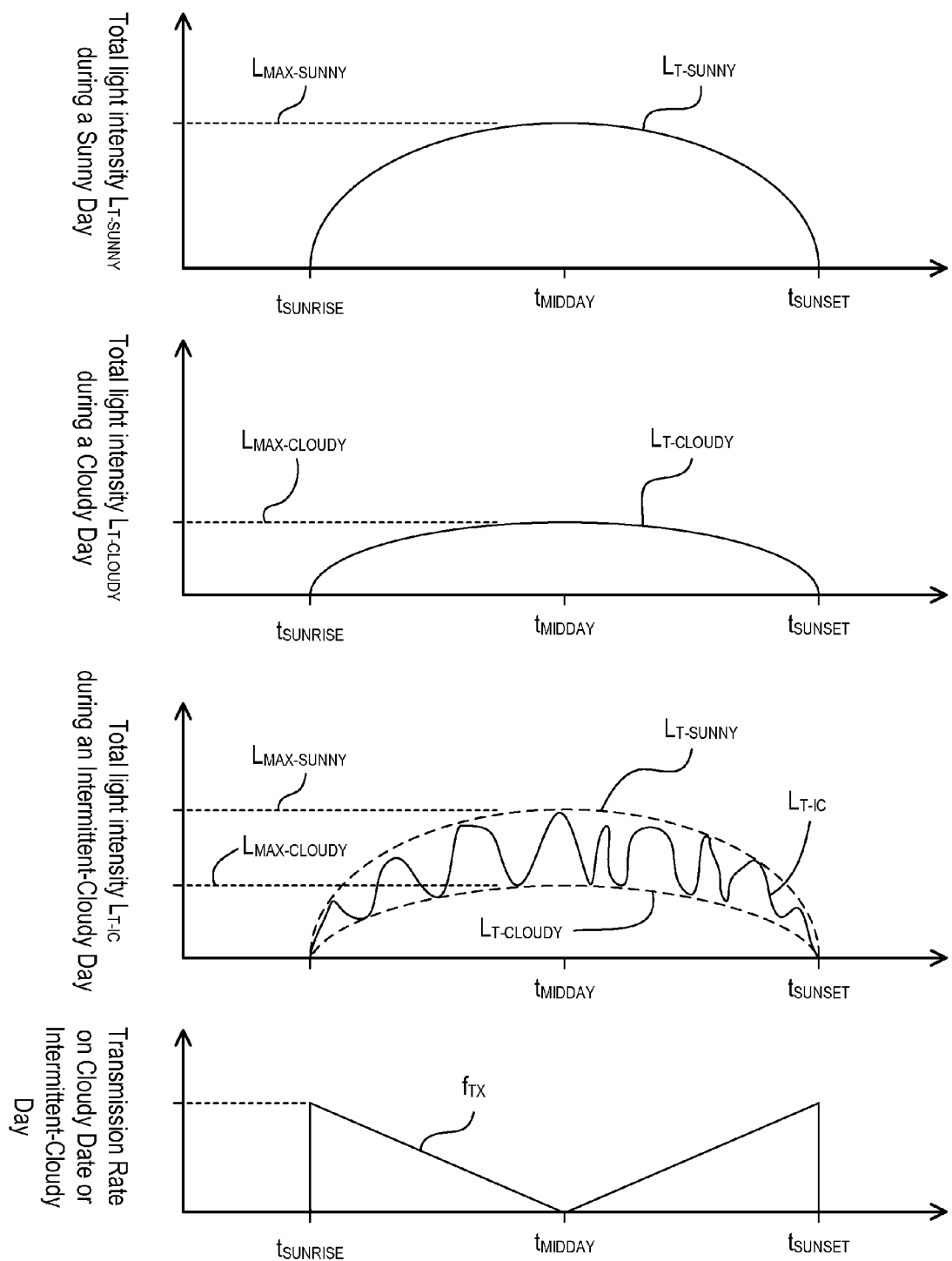
FIG. 3 shows a few example plots of total light intensities at the daylight sensor mounted in the room of FIG. 2 with respect to time during a sunny day, a cloudy day, and an intermittent-cloudy day.

During days when there are intermittent clouds passing the building in which the room 130 is located, the total light intensity $L_{T\text{-}SNSR}$ at the daylight sensor 120 may fluctuate between high values when the clouds are not blocking the sunlight and low values when the clouds are blocking the sunlight. FIG. 3 shows a few example plots of the total light intensity $L_{T\text{-}SNSR}$ as measured by the daylight sensor 120 with respect to time during a sunny day, a cloudy day, and an intermittent-cloudy day. The total light intensity $L_{T\text{-}SNSR}$ during a day typically takes the shape of a parabola. On a sunny day, a total sunny-day light intensity $L_{T\text{-}SUNNY}$ may increase from sunrise (at time $t_{SUNRISE}$) to a maximum sunny-day light intensity $L_{MAX\text{-}SUNNY}$ around midday (at time $t_{MIDDAY}$), and then decrease until sunset (at time $t_{SUNSET}$). On a cloudy day, a total cloudy-day light intensity $L_{T\text{-}CLOUDY}$ may increase from sunrise to a maximum cloudy-day light intensity $L_{MAX\text{-}CLOUDY}$ around midday, and then decreases until sunset. The maximum sunny-day light intensity $L_{MAX\text{-}SUNNY}$ is typically greater than the maximum cloudy-day light intensity $L_{MAX\text{-}CLOUDY}$. On a day having intermittent clouds, a total light intensity $L_{T\text{-}IC}$ may fluctuate between the total cloudy-day light intensity $L_{T\text{-}CLOUDY}$ and the total sunny-day light intensity $L_{T\text{-}SUNNY}$ as shown in FIG. 3.

Figure 4:
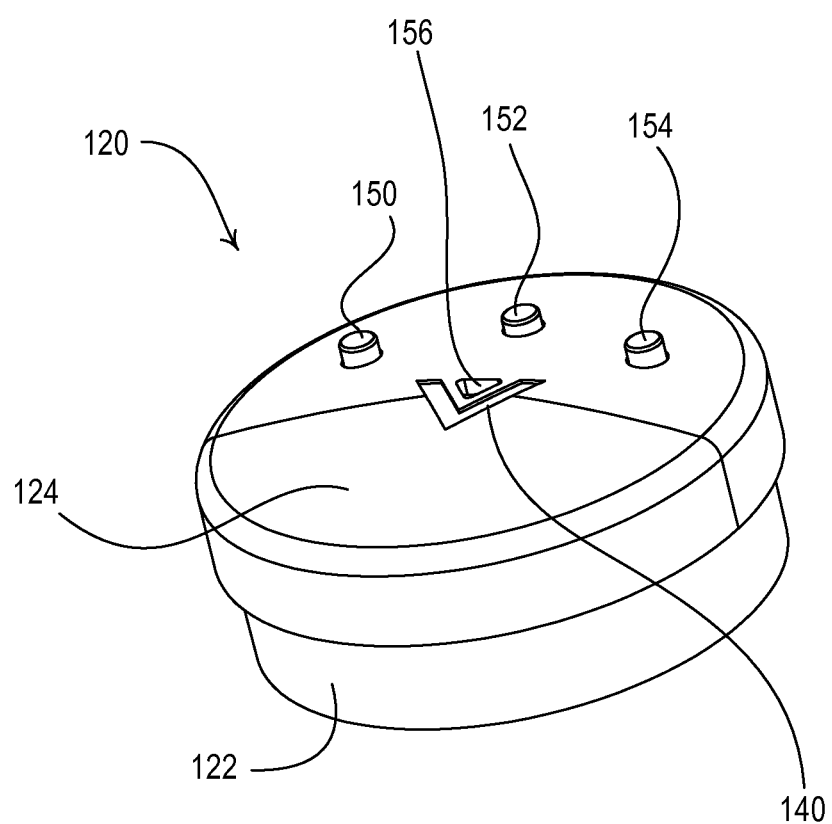
FIG. 4 is an enlarged perspective view of the daylight sensor of FIG. 1.

FIG. 4 is an enlarged perspective view of the daylight sensor 120. The lens 124 is transparent such that the light from the room 130 is able to shine onto the internal photosensitive diode 232 of the daylight sensor 120. The daylight sensor 120 is positioned on the ceiling 132 such that an arrow 140 points towards the window 134, such that lens 124 is directed towards the window 134. As a result, more natural light than artificial light will shine through the lens 124 and onto the internal photosensitive diode 232. A plurality of actuators (e.g., a calibration button 150, a test button 152, and a link button 154) are used during the setup and calibration procedures of the daylight sensor 120. The daylight sensor 120 further comprises a laser-pointer receiving opening 156, which is adapted to receive energy from a laser pointer (not shown). The daylight sensor 120 is responsive to the energy of the laser pointer shining through the laser-pointer receiving opening 156. When the daylight sensor 120 is mounted to the ceiling 132, a user may shine the laser pointer through the opening 156 rather than actuating the calibration button 150 during the gain calibration procedure.

Figure 5:
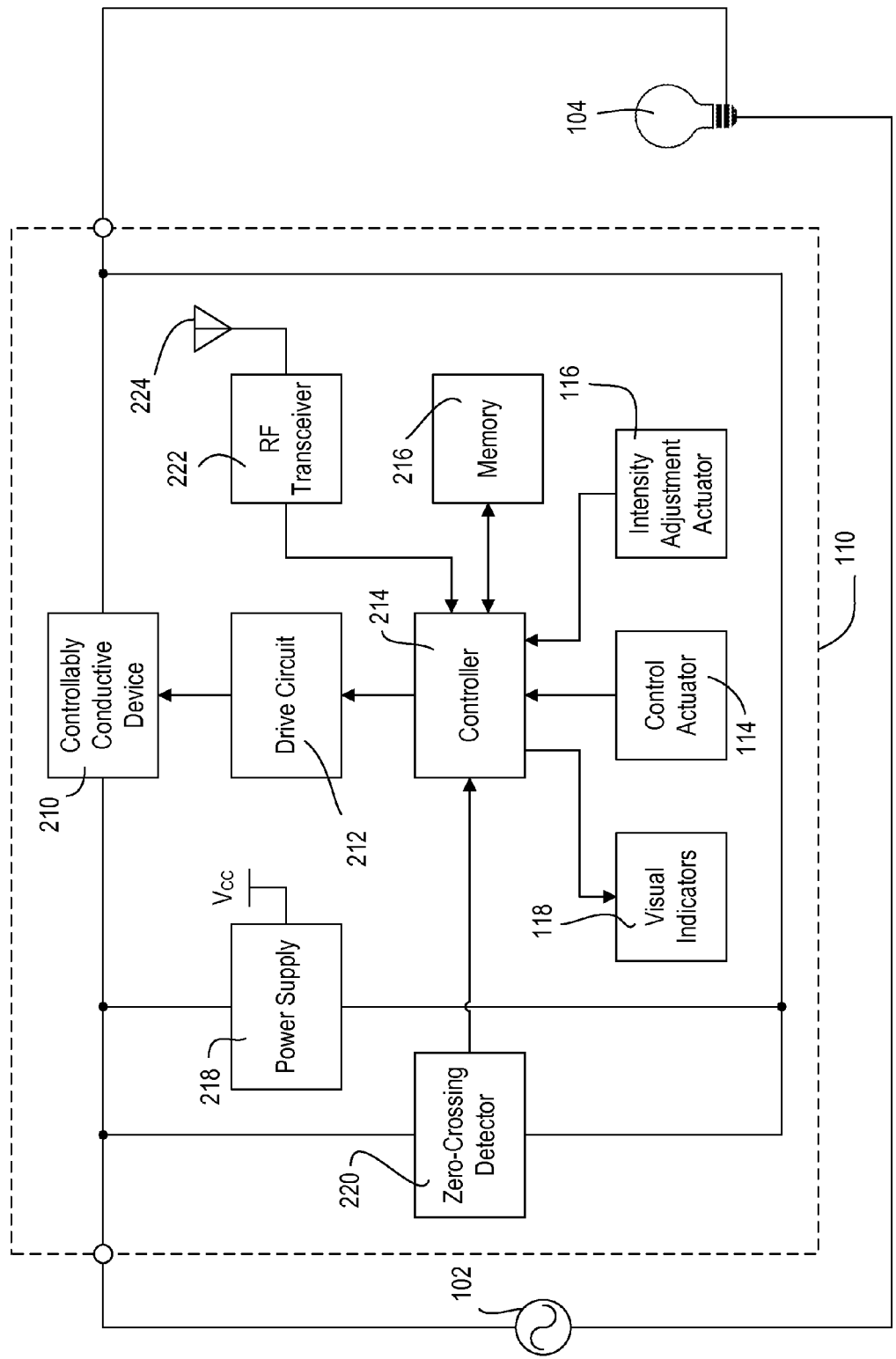
FIG. 5 is a simplified block diagram of the dimmer switch of FIG. 1.

FIG. 5 is a simplified block diagram of the dimmer switch 110. The dimmer switch 110 comprises a controllably conductive device 210 coupled in series electrical connection between the AC power source 102 and the lighting load 104 for control of the power delivered to the lighting load. The controllably conductive device 210 may comprise any suitable type of bidirectional semiconductor switch, such as, for example, a triac, a field-effect transistor (FET) in a rectifier bridge, or two FETs in anti-series connection. The controllably conductive device 210 includes a control input coupled to a drive circuit 212. The controllably conductive device 210 is rendered conductive or non-conductive in response to the control input, which in turn controls the power supplied to the lighting load 104.

The drive circuit 212 provides control inputs to the controllably conductive device 210 in response to control signals from a controller 214. The controller 214 is, for example, a microcontroller, but may alternatively be any suitable processing device, such as a programmable logic device (PLD), a microprocessor, or an application specific integrated circuit (ASIC). The controller 214 receives inputs from the control actuator 114 and the intensity adjustment actuator 116 and controls the visual indicators 118. The controller 214 is also coupled to a memory 216 for storage of the preset intensity of lighting load 104, the serial number of the daylight sensor 120 to which the dimmer switch 110 is assigned, the daylight gain $G_D$, the electrical light gain $G_E$, and other operational characteristics of the dimmer switch 110. The controller 214 may recall the daylight gain $G_D$ and the electrical light gain $G_E$ from the memory 216 at startup. The memory 216 may be implemented as an external integrated circuit (IC) or as an internal circuit of the controller 214. A power supply 218 generates a direct-current (DC) voltage $V_{CC}$ for powering the controller 214, the memory 216, and other low-voltage circuitry of the dimmer switch 110.

A zero-crossing detector 220 determines the zero-crossings of the input AC waveform from the AC power supply 102. A zero-crossing is defined as the time at which the AC supply voltage transitions from positive to negative polarity, or from negative to positive polarity, at the beginning of each half-cycle. The zero-crossing information is provided as an input to controller 214. The controller 214 provides the control signals to the drive circuit 212 to operate the controllably conductive device 210 (i.e., to provide voltage from the AC power supply 102 to the lighting load 104) at predetermined times relative to the zero-crossing points of the AC waveform using a phase-control dimming technique.

The dimmer switch 110 further comprises an RF transceiver 222 and an antenna 224 for receiving the RF signals 106 from the daylight sensor 120. The controller 214 is operable to control the controllably conductive device 210 in response to the messages received via the RF signals 106. Examples of the antenna 224 for wall-mounted dimmer switches, such as the dimmer switch 110, are described in greater detail in U.S. Pat. No. 5,982,103, issued Nov. 9, 1999, and U.S. Pat. No. 7,362,285, issued Apr. 22, 2008, both entitled COMPACT RADIO FREQUENCY TRANSMITTING AND RECEIVING ANTENNA AND CONTROL DEVICE EMPLOYING SAME. The entire disclosures of both patents are hereby incorporated by reference.

Figure 6A:
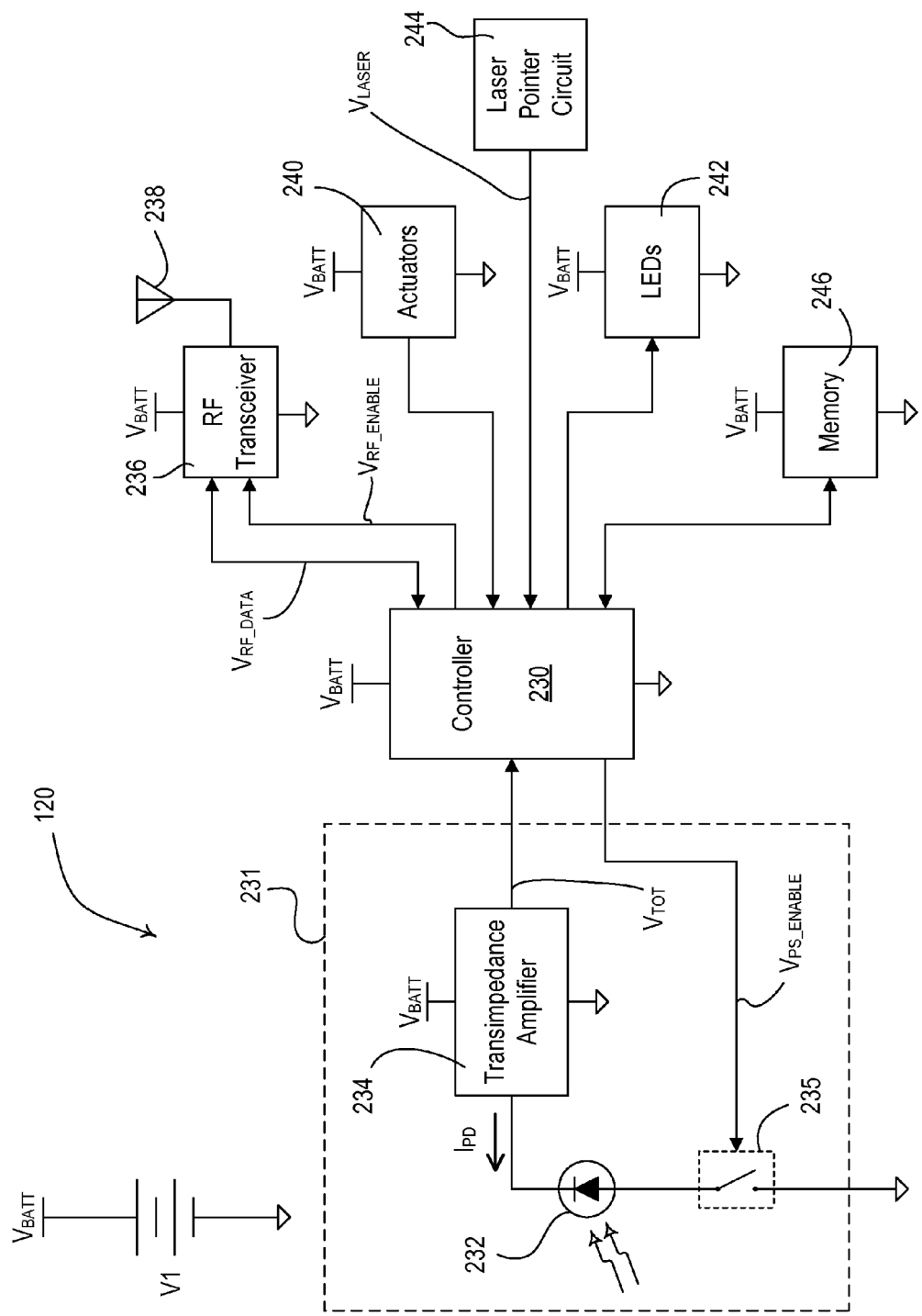
FIG. 6A is a simplified block diagram of the daylight sensor of FIG. 1.

FIG. 6A is a simplified block diagram of the daylight sensor 120. The daylight sensor 120 comprises a controller 230 that is responsive to a photosensitive circuit 231, which includes the photosensitive diode 232. The cathode of the photosensitive diode 232 is coupled to the controller 230 via a transimpedance amplifier 234, which operates as a current-to-voltage converter. The anode of the photosensitive diode 232 is coupled to circuit common through a controllable switch 235, which allows the controller 230 to enable and disable the photosensitive circuit 231 (using a photosensitive circuit enable control signal $V_{PS\_ENABLE}$) as will be described in greater detail below.

The photosensitive diode 232 conducts a photosensitive diode current $I_{PD}$ having a magnitude dependent upon the magnitude of the light that shines on the photosensitive diode (i.e., the total light intensity $L_{T-SNSR}$ as measured by the daylight sensor 120). The transimpedance amplifier 234 provides the controller 230 with a total light intensity control signal $V_{TOT}$ representative of the total light intensity $L_{T-SNSR}$. Specifically, the magnitude of the total light intensity control signal $V_{TOT}$ generated by the transimpedance amplifier 234 is dependent upon the magnitude of the current $I_{PD}$ conducted by the photosensitive diode 232, and thus the total light intensity $L_{T-SNSR}$. The controller 230 comprises an analog-to-digital converter (ADC), such that the controller is operable to sample the total light intensity control signal $V_{TOT}$ to generate a total light intensity sample $S_{TOT}$. The controller 230 uses a sampling period $T_{SMPL}$ of, for example, approximately one second, such that the controller samples the total light intensity control signal $V_{TOT}$ approximately once every second during normal operation of the daylight sensor 120.

The daylight sensor 120 further comprises an RF transceiver 236, which is coupled to the controller 230 and an antenna 238. The controller 230 is operable to cause the RF transceiver 236 to transmit digital messages to the dimmer switch 110 via the RF signals 106 in response to the magnitude of the total light intensity control signal $V_{TOT}$. The controller 230 may also be operable to receive a digital message from the dimmer switch 110 or another remote control device, such as a personal digital assistant (PDA), for configuring the operation of the daylight sensor 120. The controller 230 provides the digital message to be transmitted by the RF transceiver 236 and obtains received digital messages from the RF transmitter via an RF data control signal $V_{RF\_DATA}$. The controller 230 also is operable to enable and disable the RF transceiver via an RF enable control signal $V_{RF\_ENABLE}$. Alternatively, the RF transceiver 236 of the daylight sensor 120 could comprise an RF transmitter and the RF transceiver 222 of the dimmer switch 110 could comprise an RF receiver to allow for one-way communication between the daylight sensor and the dimmer switch. The RF transmitter may comprise, for example, part number CC1150 manufactured by Texas Instruments Inc.

The controller 230 of the daylight sensor 120 is also responsive to a plurality of actuators 240 (i.e., the calibration button 150, the test button 152, and the link button 154), which provide user inputs to the daylight sensor for use during calibration of the daylight sensor. The controller 230 is operable to control one or more LEDs 242 to illuminate the lens 124 to thus provide feedback during calibration of the daylight sensor 120. A laser pointer circuit 244 is coupled to the controller 230 and is responsive to light that shines through the laser-pointer receiving opening 156 from a laser pointer. Specifically, the controller 230 responds to an input from the laser pointer circuit 244 in the same manner as an actuation of the calibration button 150. The controller 230 is further coupled to a memory 246 for storing the operational characteristics of the daylight sensor 120. The daylight sensor 120 also comprises a battery V1 that provides a battery voltage $V_{BATT}$ (e.g., approximately three volts) for powering the controller 230, the photosensitive circuit 231, the RF transceiver 236, and the other circuitry of the daylight sensor 120.

The controller 230 is operable to control the photosensitive circuit 231 and the RF transceiver 236 in order to conserve battery power. Specifically, the controller 230 is operable to enable the photosensitive circuit 231 (by closing the switch 235 via the photosensitive circuit enable control signal $V_{PS\_ENABLE}$) for a small time period $T_{PD}$ (e.g., 50 msec) during each sampling period $T_{SMPL}$, such that that the photosensitive diode 232 only conducts current for a portion of the time during normal operation (e.g., 5% of the time). In addition, the controller 230 only enables the RF transceiver 236 (via the RF enable control signal $V_{RF\_ENABLE}$) when required. As previously mentioned, the controller 230 only enables the RF transceiver 236 to transmit digital messages when needed, i.e., using the variable transmission rate (as will be described in greater detail below with reference to FIG. 8). The controller 230 only enables the RF transceiver 236 to receive digital messages in response to the laser pointer circuit 244 receiving light from a laser pointer through the laser-pointer receiving opening 156. When the photosensitive circuit 231 and the RF transceiver 236 are disabled, the controller 230 is operable to enter a sleep mode in which the controller consumes less power.

Figure 6B:
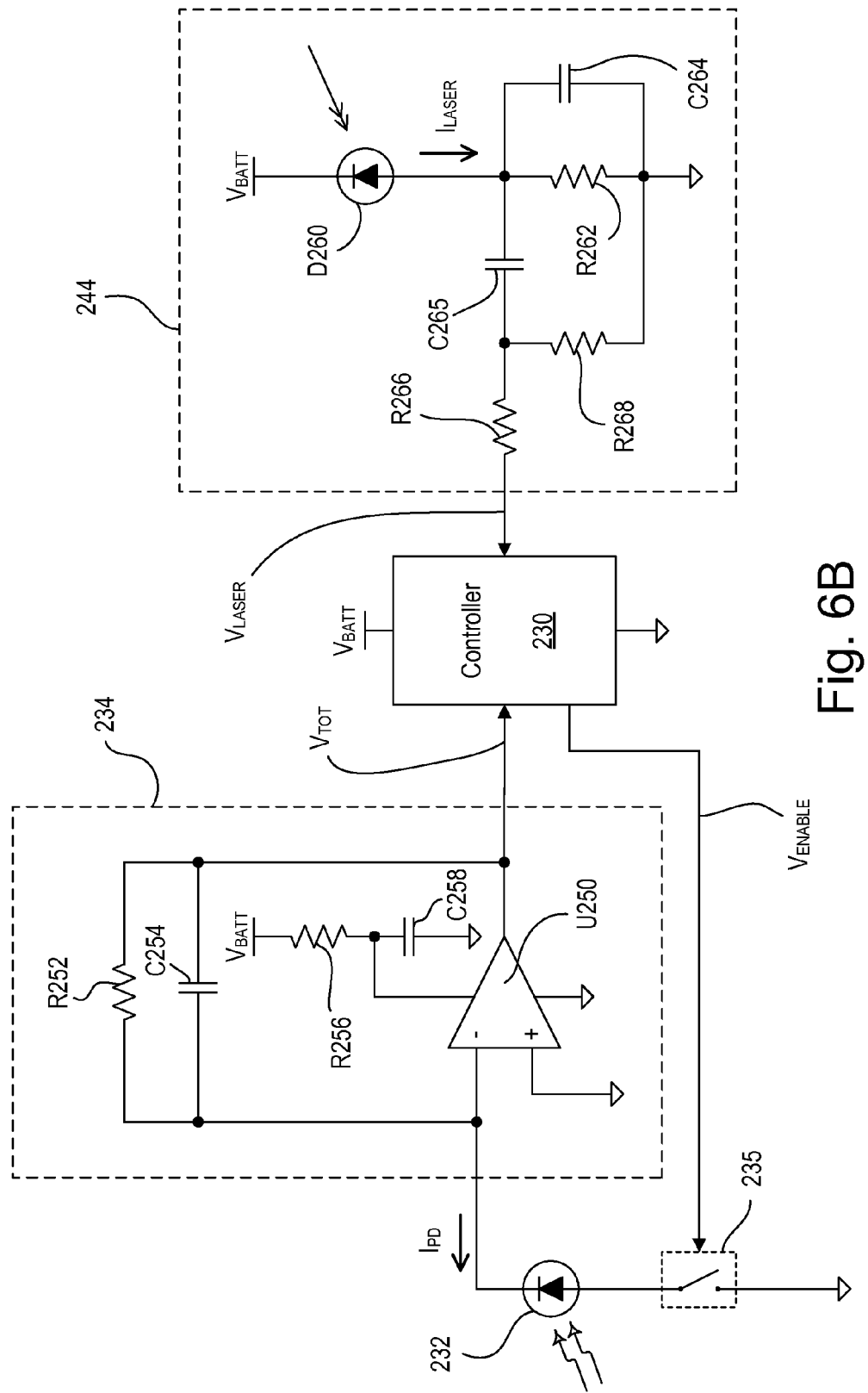
FIG. 6B is a simplified schematic diagram of the daylight sensor of FIG. 6A.

FIG. 6B is a simplified schematic diagram of the daylight sensor 120 showing the transimpedance amplifier 234 and the laser pointer circuit 244 in greater detail. The transimpedance amplifier 234 comprises an operational amplifier ("op-amp") U250 having a non-inverting input terminal coupled to circuit common. A feedback resistor R252 is coupled between an inverting input terminal and an output terminal of the op-amp U250. The output terminal of the op-amp U250 provides to the controller 230 the total light intensity control signal $V_{TOT}$, which has a magnitude that varies in response to the magnitude of the photosensitive diode current $I_{PD}$. The cathode of the photosensitive diode 232 is coupled to the inverting input terminal of the op-amp U250, such that the photosensitive diode current $I_{PD}$ is conducted through the feedback resistor R252. Thus, the magnitude of the total light intensity control signal $V_{TOT}$ is dependent upon the magnitude of the photosensitive diode current $I_{PD}$ and the resistance of the feedback resistor R252. For example, the resistor R252 may have a resistance of approximately 300 kΩ, such that the magnitude of the total light intensity control signal $V_{TOT}$ ranges from approximately zero volts to three volts as the light intensity shining directly on the photosensitive diode 232 ranges from approximately zero lux to 1000 lux.

The transimpedance amplifier 234 further comprises a feedback capacitor C254 (e.g., having a capacitance of approximately 0.022 µF) for providing some low-pass filtering, such that the magnitude of the total light intensity control signal $V_{TOT}$ is not responsive to high-frequency noise in the photosensitive diode current $I_{PD}$. In addition, the op-amp U250 is powered from the battery V1 through a low-pass filter comprising a resistor R256 (e.g., having a resistance of approximately 22Ω and a capacitor C258 (e.g., having a capacitance of approximately 0.1 µF). The low-pass filter prevents high-frequency noise that may be coupled to the battery V1 from the RF transceiver 236 from affecting the operation of the photosensitive circuit 231.

The laser pointer circuit 244 comprises a laser-responsive element, e.g., a light-emitting diode (LED) D260. The LED D260 is positioned inside the daylight sensor 120 such that light from a laser pointer may shine through the laser-pointer receiving opening 156 and onto the LED. The LED D260 may be a green LED, such that a laser current $I_{LASER}$ conducted through the LED increases in magnitude when a green laser pointer is shined onto the LED. A resistor R262 is coupled between the anode of the LED D260 and circuit common and has, for example, a resistance of approximately 1 MΩ. A capacitor C264 is coupled in parallel with the resistor R262 and has, for example, a capacitance of approximately 0.01 µF. The junction of the LED D260 and the resistor R262 is coupled to the controller 230 through a capacitor C265 (e.g., having a capacitance of approximately 0.22 µF) and a resistor R266 (e.g., having a resistance of approximately 10 kΩ). The junction of the capacitor C265 and the resistor R266 is coupled to circuit common through a resistor (e.g., having a resistance of approximately 1 MΩ). When a laser pointer is shined onto the LED D260 and the laser current $I_{LASER}$ increases in magnitude, the voltage across the parallel combination of the resistor R262 and the capacitor C264 also increases in magnitude. Accordingly, the capacitor C265 conducts a pulse of current and the laser pointer control signal $V_{LASER}$ also increases in magnitude. The input of the controller 230 that receives the laser pointer control signal $V_{LASER}$ is an interrupt pin, such that the controller 230 is operable to come out of sleep mode in response to the laser pointer. The controller 230 may then be operable to enable the RF transceiver 236 to receive a digital message as will be described in greater detail below with reference to FIG. 10A.

According to the present invention, the daylight sensor 120 is operable to transmit digital messages to the dimmer switch 110 using the variable transmission rate that is dependent upon the present change in the total light intensity $L_{T\text{-}SNSR}$ as measured by the daylight sensor 120. The daylight sensor 120 is operable to determine the total light intensity $L_{T\text{-}SNSR}$ from the magnitude of the total light intensity control signal $V_{TOT}$, and to only transmit one or more values representative of the total light intensity $L_{T\text{-}SNSR}$ (e.g., in foot-candles) to the dimmer switch 110 when the total light intensity $L_{T\text{-}SNSR}$ has changed by at least a first predetermined percentage $\Delta S_{MAX1}$. Since the total light intensity $L_{T\text{-}SNSR}$ as measured by the daylight sensor 120 changes throughout a typical day, the variable transmission rate also changes throughout the day (as shown in FIG. 3). The variable transmission rate ensures that the daylight sensor 120 only transmits digital messages when needed (i.e., when the total light intensity $L_{T\text{-}SNSR}$ is changing quickly, but not too quickly). Because the controller 230 is able to disable the photosensitive circuit 231 (by opening the switch 235 via the photosensitive circuit enable control signal $V_{PS\_ENABLE}$), the daylight sensor 120 is able to conserve battery power by not transmitting digital messages to the dimmer switch 110 as often when the total light intensity $L_{T\text{-}SNSR}$ is relatively constant with respect to time.

Figure 7:
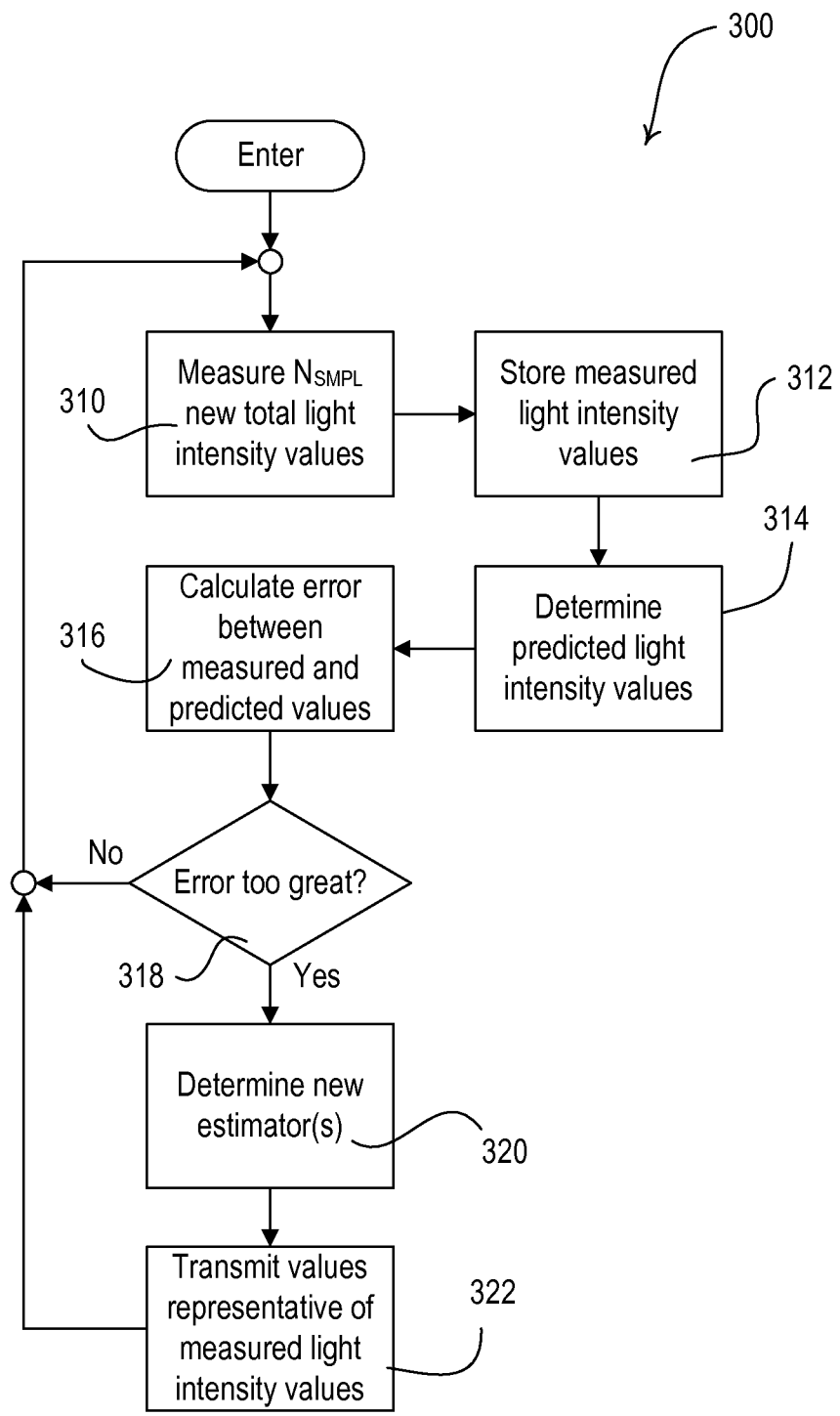
FIG. 7 is a simplified flowchart of a transmission algorithm executed by a controller of the daylight sensor of FIG. 1 according to a first embodiment of the present invention, such that the daylight sensor transmits digital messages using a variable transmission rate.

FIG. 7 is a simplified flowchart of a transmission algorithm 300 executed by the controller 230 of the daylight sensor 120 according to the first embodiment of the present invention, such that the daylight sensor 120 transmits digital messages using the variable transmission rate. The transmission algorithm 300 as shown in FIG. 7 is generalized and specific embodiments are detailed below. According to the first embodiment, the controller 230 collects a predetermined number $N_{SMPL}$ of measurements of the total light intensity $L_{T\text{-}SNSR}$ (e.g., ten) during consecutive non-overlapping time intervals (i.e., windows) that each have a length equal to a predetermined time period $T_{WIN}$ (i.e., $T_{WIN}=N_{SMPL} \cdot T_{SMPL}$). The controller 230 determines one or more estimators from a previous time interval and uses the estimator to estimate one or more predicted light intensity values in the present time interval. At end of the present time interval, the controller 230 determines whether a digital message including one or more values representative of the total light intensity $L_{T\text{-}SNSR}$ should be transmitted to the dimmer switch 110 in response to the error between the measured light intensity values and the predicted light intensity values. The transmission algorithm 300 is executed with at a period equal to the predetermined time period $T_{WIN}$. Accordingly, the minimum time period between transmissions by the daylight sensor 120 according to the first embodiment is equal to the predetermined time period $T_{WIN}$. For example, the predetermined time period $T_{WIN}$ may be approximately ten seconds, but may alternatively range from approximately five seconds to thirty seconds.

Referring to FIG. 7, the controller 230 first measures the predetermined number $N_{SMPL}$ of new total light intensity values at step 310, and stores the measured total light intensity values at step 312. Next, the controller 230 determines the predicted light intensity value(s) at step 314 using the estimator(s) determined during one of the previous time intervals, and calculates an error between the measured total light intensity values and the predicted total light intensity values at step 316. If the error is outside of predetermined limits (i.e., is too great) at step 318, the controller 230 calculates the new estimator(s) for use during the subsequent time interval at step 320 and transmits a digital message including one or more values representative of the total light intensity $L_{T\text{-}SNSR}$ as measured by the daylight sensor 120 to the dimmer switch 110 at step 322. For example, the controller 230 may transmit one or more of the measured total light intensity values to the dimmer switch 110. Alternatively, the controller 230 may transmit the new estimator(s) determined at step 320 to the dimmer switch 110. After transmitting a digital message to the dimmer switch 110, the transmission algorithm 300 loops around, such that the controller 230 may collect the predetermined number $N_{SMPL}$ of measurements of the total light intensity $L_{T\text{-}SNSR}$ during the subsequent non-overlapping time interval. If the error is within the predetermined limits at step 318, the controller 230 does not calculate the new estimator(s) at step 320 and does not transmit the value representative of the total light intensity $L_{T\text{-}SNSR}$ at step 324, but simply analyzes the next non-overlapping time interval.

According to the first embodiment of the present invention, the controller 230 of the daylight sensor 120 uses a single data point as the estimator. For example, the controller 230 may use the minimum value of the measured light intensity values from the previous time interval as the estimator. Alternatively, the controller 230 may use the average or median value of the measured light intensity values from the previous time interval as the estimator. Since the estimator is a single data point, the controller 230 only uses one predicted light intensity value at step 314 of the transmission algorithm 300. For example, the predicted light intensity value may be equal to the estimator. The controller 230 then calculates the error using the minimum value of the measured light intensity values from the present time interval and the predicted light intensity value (i.e., the estimator).

Figure 8:
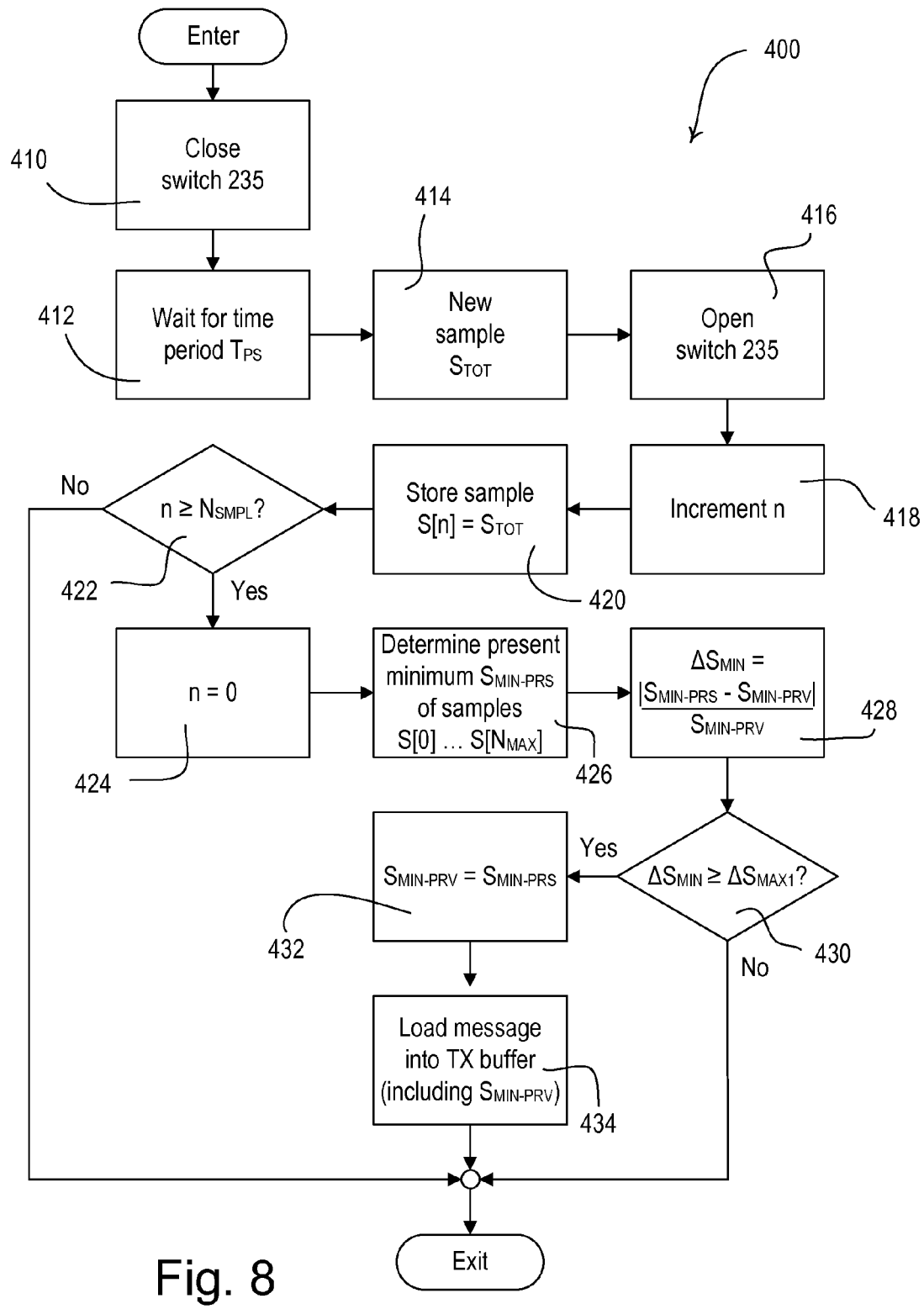
FIG. 8 is a simplified flowchart of a variable transmission control procedure executed by the controller of the daylight sensor of FIG. 1 according to the first embodiment of the present invention.

FIG. 8 is a simplified flowchart of a variable transmission control procedure 400 executed by the controller 230 of the daylight sensor 120 according to the first embodiment of the present invention. The controller 230 executes the variable transmission control procedure 400 periodically (e.g., approximately once every second) during normal operation in order to sample the total light intensity control signal $V_{TOT}$, to thus collect the predetermined number $N_{SMPL}$ of samples (e.g., approximately ten samples) during each of the consecutive non-overlapping time intervals. Specifically, the controller 230 first enables the photosensitive circuit 231 at step 410 by closing the controllable switch 235 using the photosensitive circuit enable control signal $V_{PS\_ENABLE}$. The controller 230 waits for the time period $T_{PD}$ (i.e., 50 msec) at step 412 to allow the photosensitive diode current $I_{PD}$ to become representative of the total light intensity $L_{T\text{-}SNSR}$ at the daylight sensor 120. The controller 230 samples the total light intensity control signal $V_{TOT}$ to generate a new total light intensity sample $S_{TOT}$ at step 414, and disables the photosensitive circuit 231 by opening the switch 235 using the photosensitive circuit enable control signal $V_{PS\_ENABLE}$ at step 416. The controller 230 then increments a variable n by one at step 418 and stores the new total light intensity sample $S_{TOT}$ as sample S[n] in the memory 246 at step 420. If the variable n is less than the predetermined number $N_{SMPL}$ of samples at step 422, the variable transmission control procedure 400 simply exits without processing the samples S[n] stored in the memory 246. The controller 230 will execute the variable transmission control procedure 400 once again to collect a new sample of the total light intensity control signal $V_{TOT}$.

If the variable n is greater than or equal to the predetermined number $N_{SMPL}$ of samples at step 422, the controller 230 processes the samples S[n] stored in the memory 246 in order to determine if a digital message should be transmitted to the dimmer switch 110. First, the controller 230 resets the variable n to zero at step 424. The controller 230 then determines if the total light intensity $L_{T-SNSR}$ has changed by at least the first predetermined percentage $\Delta S_{MAX1}$. Specifically, the controller 230 determines a present minimum sample $S_{MIN-PRS}$ of the samples S[n] stored in the memory 246 (i.e., samples S[0] through $S[N_{SMPL}]$) at step 426. The controller 230 then calculates a minimum sample adjustment percentage $\Delta S_{MIN}$ that is representative of the amount of change of the total light intensity $L_{T-SNSR}$ at step 428 using the equation:

$$\Delta S_{MIN} = \frac{|S_{MIN-PRS} - S_{MIN-PRV}|}{S_{MIN-PRV}}, \quad \text{(Equation 1)}$$

where the sample $S_{MIN-PRS}$ is the previous minimum sample determined during the previous time period $T_{WIN}$ that is stored in the memory 246. If the minimum sample adjustment percentage $\Delta S_{MIN}$ is less than the first predetermined percentage $\Delta S_{MAX1}$ at step 430, the variable transmission control procedure 400 exits without the controller 230 transmitting a digital message to the dimmer switch 110. In other words, the controller 230 has determined that the total light intensity $L_{T-SNSR}$ has not changed significantly enough to merit a transmission of a digital message. For example, the first predetermined percentage $\Delta S_{MAX1}$ may be approximately 15%, but may alternatively range from approximately 1% to 20%.

If the minimum sample adjustment percentage $\Delta S_{MIN}$ is greater than or equal to the first predetermined percentage $\Delta S_{MAX1}$ at step 430, the controller 230 sets the previous minimum sample $S_{MIN-PRV}$ equal to the present minimum sample $S_{MIN-PRS}$ at step 432. The controller 230 then loads a digital message including a value representative of the total light intensity $L_{T-SNSR}$ as measured by the daylight sensor 120 (e.g., in foot-candles) in a transmit (TX) buffer at step 434, before the variable transmission control procedure 400 exits. For example, the controller 230 may include the minimum present minimum sample $S_{MIN-PRS}$ in the digital message loaded into the TX buffer. The controller 230 will transmit the digital message to the dimmer switch 110 via the RF signals 106 using a transmit procedure (not shown). An example of a transmit procedure is described in previously-referenced U.S. patent application Ser. No. 12/203,518.

Figure 9:
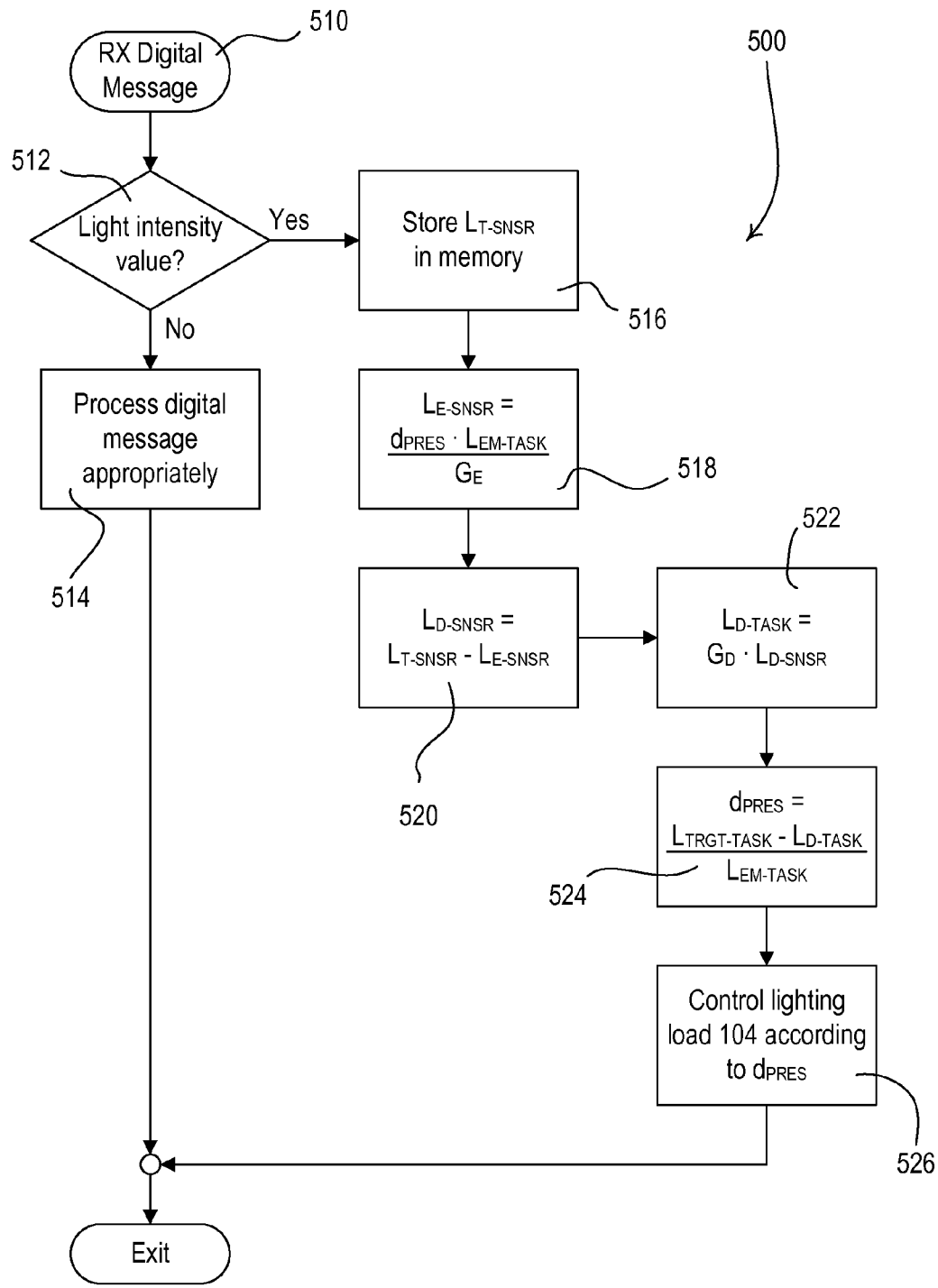
FIG. 9 is a simplified flowchart of a receive procedure executed by a controller of the dimmer switch of FIG. 1 according to the first embodiment of the present invention.

FIG. 9 is a simplified flowchart of a receive procedure 500 executed by the controller 214 of the dimmer switch 110 when a digital message is received from the daylight sensor 120 at step 510. As previously mentioned, the dimmer switch 110 adjusts the present light intensity $L_{PRES}$ of the lighting load 104 so as to control the total light intensity $L_{T-TASK}$ on the task surface towards the target total task surface light intensity $L_{TRGT-TASK}$. Specifically, the dimmer switch 110 uses a present dimming percentage $d_{PRES}$ to control the present light intensity $L_{PRES}$ of the lighting load 104. The present dimming percentage $d_{PRES}$ is calculated in response to the received digital messages and a target task surface light intensity value $L_{TRGT-TASK}$ during the receive procedure 500. For example, the present dimming percentage $d_{PRES}$ may be a number between zero and one. The controller 214 may apply the present dimming percentage $d_{PRES}$ to different dimming curves depending upon the load type of the lighting load 104 (i.e., incandescent, fluorescent, etc.) to determine the actual new present light intensity $L_{PRES}$ of the lighting load.

Referring to FIG. 9, if the received digital message does not include a light intensity value received from the daylight sensor 120 at step 512, the controller 214 processes the digital message appropriately at step 514 and the receive procedure 500 exits. For example, the digital message may comprise a calibration message transmitted during a calibration procedure of the daylight sensor 120. However, if the received digital message includes a light intensity value at step 512, the controller 214 stores the total light intensity $L_{T-SNSR}$ as measured by the daylight sensor 120 (and as received in the digital message) in the memory 248 at step 516. As noted above, the value representative of the total light intensity $L_{T-SNSR}$ in the received digital message may be equal to the minimum present minimum sample $S_{MIN-PRS}$ from the variable transmission control procedure 400 executed by the controller 230 of the daylight sensor 120 (i.e., $L_{T-SNSR} = S_{MIN-PRS}$).

At step 518, the controller 214 calculates the light intensity $L_{E-SNSR}$ measured by the daylight sensor 120 from only the lighting load 104 using the electric light gain $G_E$, i.e., $$L_{E-SNSR} = \frac{d_{PRES} \cdot L_{EM-TASK}}{G_E}, \quad \text{(Equation 2)}$$

where $L_{EM-TASK}$ represents the light intensity on the task surface 136 from only the lighting load 104 when the lighting load is at the maximum light intensity. For example, the controller 214 may set the light intensity $L_{EM-TASK}$ from Equation 2 equal to the light intensity $L_{E-TASK}$ on the task surface from only the lighting load 104 (from the gain calibration procedure), or to a predetermined value, such as, fifty foot-candles. At step 520, the controller 214 calculates the light intensity $L_{T-SNSR}$ at the daylight sensor 120 from only natural light by subtracting the light intensity $L_{E-SNSR}$ at the daylight sensor from only the lighting load 104 (as calculated at step 518) from the total light intensity $L_{T-SNSR}$ measured by the daylight sensor (as received in the digital message), i.e., $$L_{D-SNSR} = L_{T-SNSR} - L_{E-SNSR}. \quad \text{(Equation 3)}$$

At step 522, the controller 214 calculates the light intensity $L_{D-TASK}$ on the task surface from only daylight by multiplying the light intensity $L_{D-SNSR}$ at the daylight sensor 120 from only daylight by the daylight gain $G_D$, i.e., $$L_{D-TASK} = G_D \cdot L_{D-SNSR}. \quad \text{(Equation 4)}$$

At step 524, the controller 214 calculates the new present dimming percentage $d_{PRES}$ as a function of the target total task surface light intensity $L_{TRGT-TASK}$, the light intensity $L_{D-TASK}$ on the task surface from only daylight, and the light intensity $L_{EM-TASK}$ on the task surface 136 from only the lighting load 104 when the lighting load is at the maximum light intensity, i.e., $$d_{PRES} = \frac{L_{TRGT-TASK} - L_{D-TASK}}{L_{EM-TASK}}. \quad \text{(Equation 5)}$$

Finally, the controller 214 controls the lighting load 104 according to the new present dimming percentage $d_{PRES}$, before the receive procedure 500 exits.

Figure 10A:
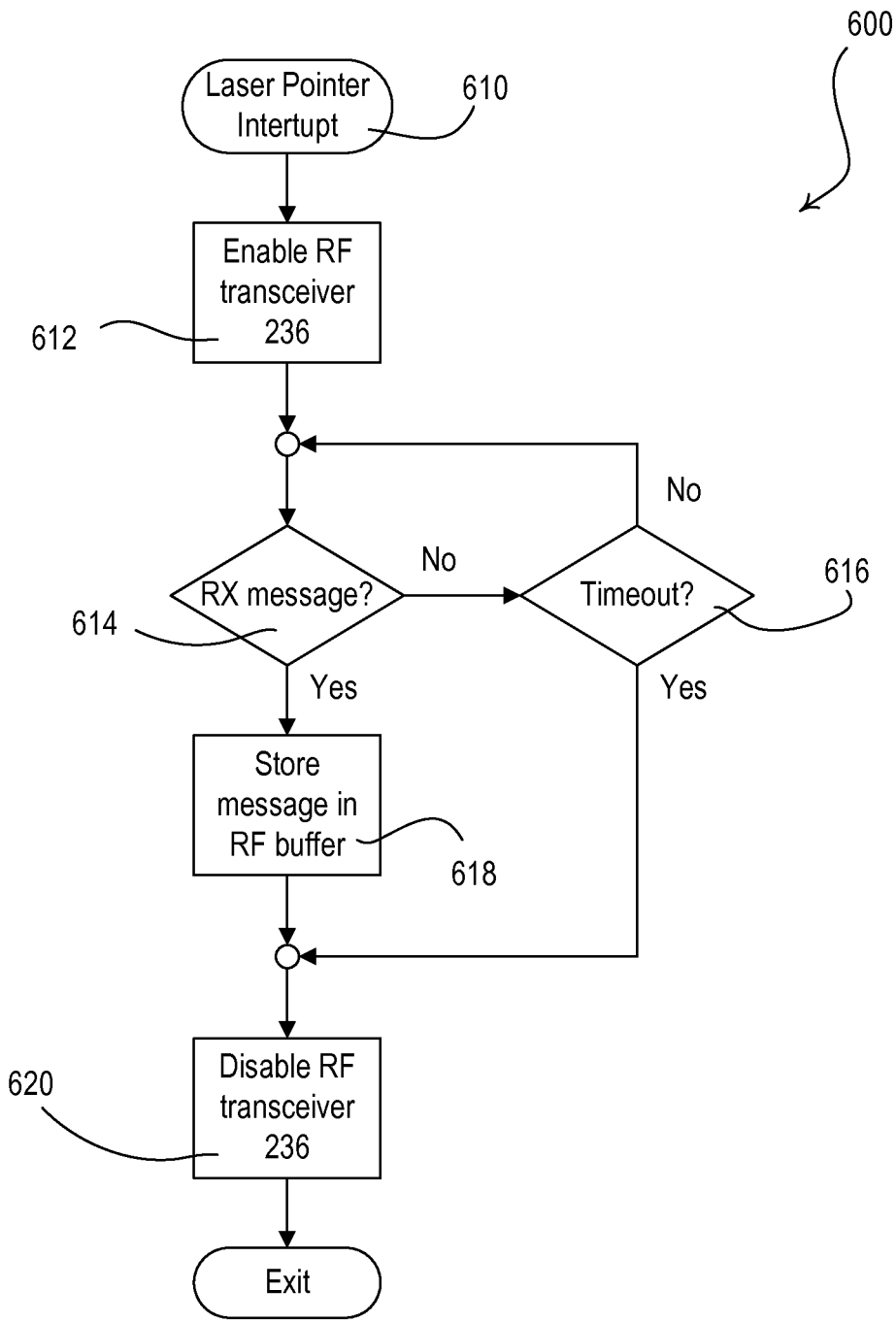
FIG. 10A is a simplified flowchart of a laser pointer interrupt procedure executed by the controller of the daylight sensor of FIG. 1.

FIG. 10A is a simplified flowchart of a laser pointer interrupt procedure 600 executed by the controller 230 in response to the laser pointer circuit 244 detecting light from a laser pointer when the controller is in the sleep mode. Specifically, when the laser pointer control signal $V_{LASER}$ is pulled high towards the battery voltage $V_{BATT}$ at step 610, the controller 230 first enables the RF transceiver 236 via the RF enable control signal $V_{RF\_ENABLE}$ at step 612. The controller 230 then waits until a digital message is received at step 614 or a timeout expires at step 616. If a digital message is received at step 614 (e.g., from the dimmer switch 110), the controller 230 stores the received digital message in a receive (RX) buffer at step 618, such that the controller 230 may process the received digital message at a later time. The controller 230 then disables the RF transceiver 236 via the RF enable control signal $V_{RF\_ENABLE}$ at step 620, and the laser pointer interrupt procedure 600 exits. If the timeout expires at step 616 before a digital message is received at step 614, the controller 230 simply disables the RF transceiver 236 at step 620, before the laser pointer interrupt procedure 600 exits.

Figure 10B:
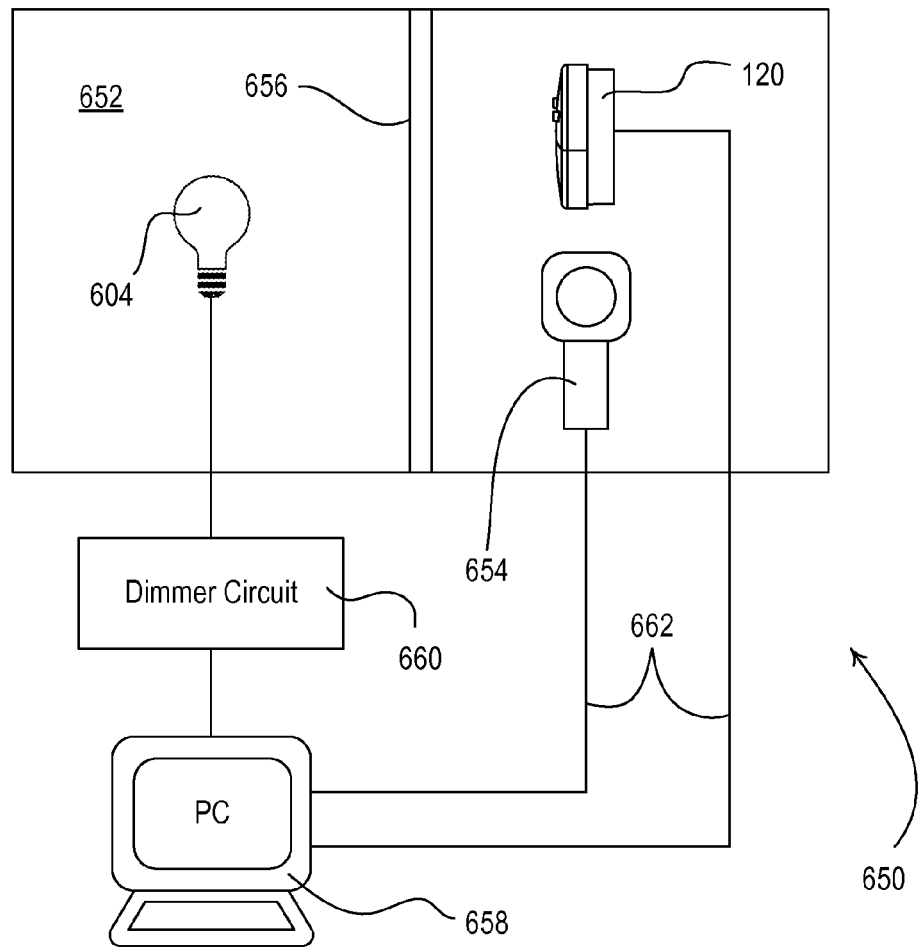
FIG. 10B is a diagram of an example test setup for the daylight sensor of FIG. 1 according to the first embodiment of the present invention.
Figure 10C:
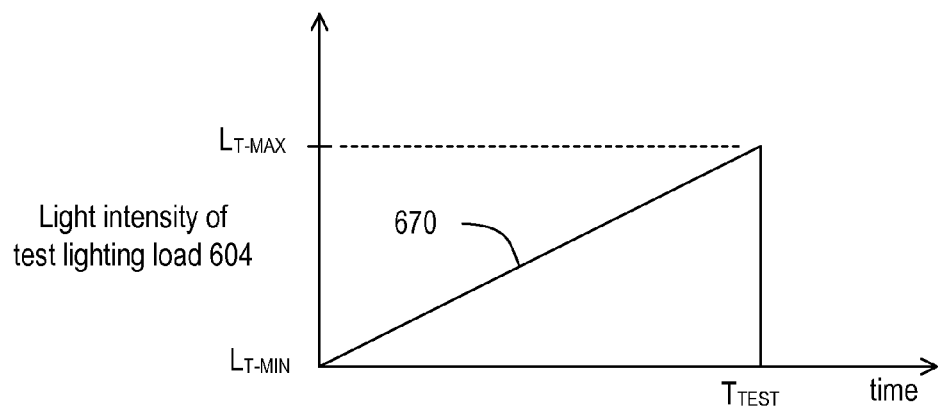
FIG. 10C is a plot of an example test waveform for the daylight sensor of FIG. 1 according to the first embodiment to be used in the test setup shown in FIG. 10B.

FIG. 10B is a diagram of an example test setup 650 and FIG. 10C is a plot of an example test waveform 670 for the daylight sensor 120 of the first embodiment. The test setup 650 comprises test box 652 having a first compartment in which a test lighting load 604 is located and a second compartment in which the daylight sensor 120 and a light meter 654 are located. The first and second compartments of the test box 652 are separated by a light diffuser 656. The test setup 650 further comprises a personal computer (PC) 658, which coupled to the daylight sensor 120 and the light meter 654 via serial connections 662. The PC is operable to adjust the intensity of the lighting load 604 using a dimmer circuit 660 according to the test waveform 670 and to observe the transmission rate of the daylight sensor 120 as well as the actual light intensity as measured by the light meter 654. The test waveform 670 controls the intensity of the test lighting load 604 linearly from a minimum test intensity $L_{T-MIN}$ to a maximum test intensity $L_{T-MAX}$ and has a length $T_{TEST}$, such that the test waveform 670 has a slope $m_{TEST}$, i.e., $m_{TEST} = (L_{T-MAX} - L_{T-MIN})/T_{TEST}$. If the test waveform 670 has a first slope, the rate of transmission of the daylight sensor 120 of the first embodiment will remain constant at a first rate. For example, the minimum test intensity $L_{T-MIN}$ may be zero foot-candles, the maximum test intensity $L_{T-MAX}$ may be 50 foot-candles, and the length $T_{TEST}$ may be two hours. If the test waveform 670 is altered to have a second slope less than the first slope (e.g., if the length $T_{TEST}$ is increased to approximately three hours), the rate of transmission of the daylight sensor 120 will change to a second rate less than the first rate.

According to a second embodiment of the present invention, the controller 230 uses a linear least-squares prediction model to determine the predicted light intensity values. Specifically, the controller 230 is operable to perform a linear least-squares fit on the measured light intensity values from a present time interval to determine a slope m and an offset b of a line (i.e., y=mx+b) that best represents the change in the measured light intensity values with respect to time. The controller 230 uses these estimators (i.e., the slope m and the offset b) to determine the predicted light intensity values for one or more of the subsequent time intervals. The controller 230 then determines a mean-square error e between the measured light intensity values and the predicted light intensity values.

Figure 11:
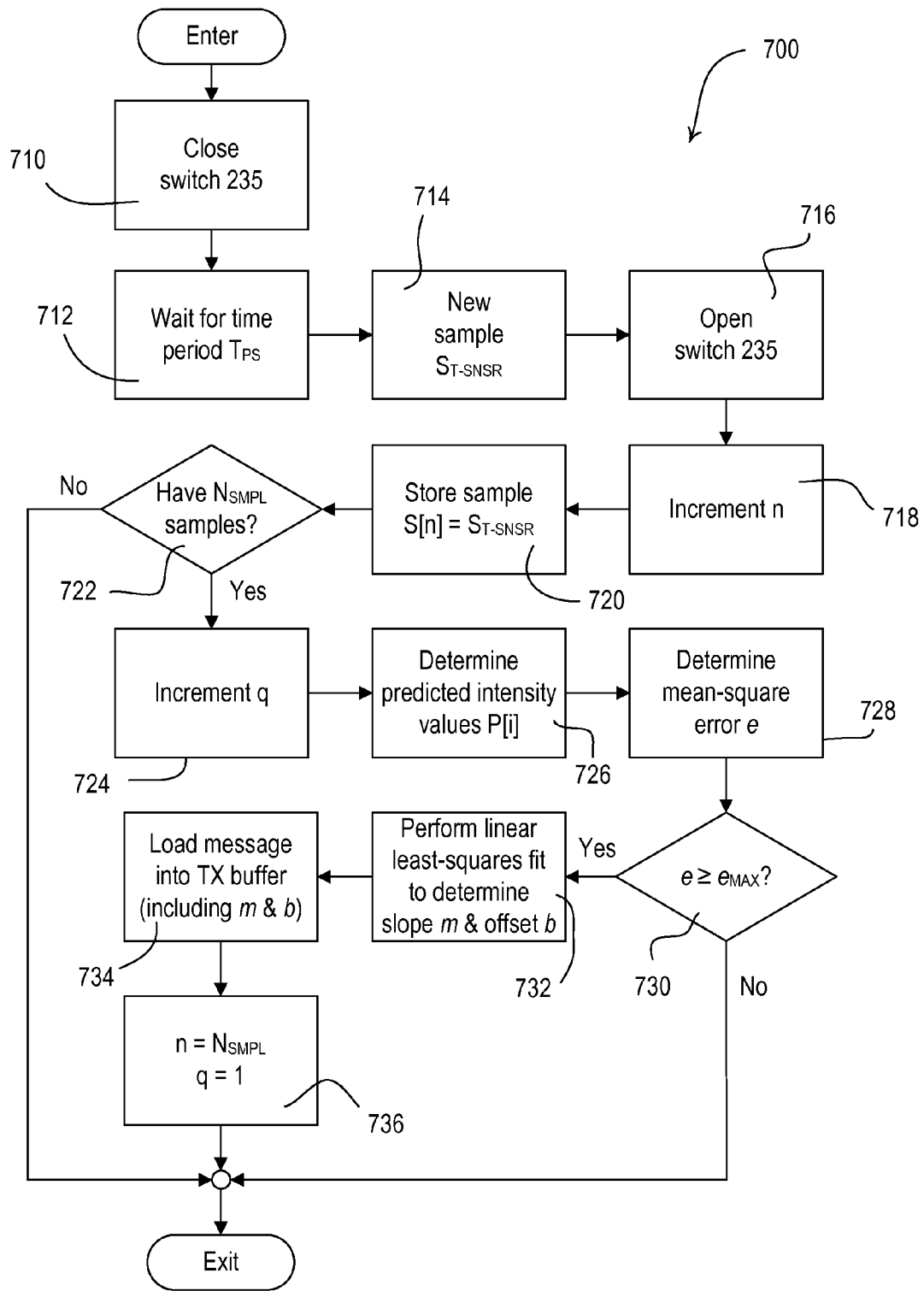
FIG. 11 is a simplified flowchart of a variable transmission control procedure executed by the controller of the daylight sensor of FIG. 1 according to a second embodiment of the present invention.

FIG. 11 is a simplified flowchart of a variable transmission control procedure 700 executed by the controller 230 of the daylight sensor 120 according to the second embodiment of the present invention. As in the first embodiment, the controller 230 executes the variable transmission control procedure 700 of the second embodiment periodically (e.g., approximately once every second) during normal operation to sample the total light intensity control signal $V_{TOT}$ and to collect the predetermined number $N_{SMPL}$ of samples during each of the consecutive non-overlapping time intervals. The controller 230 closes the controllable switch 235 to enable the photosensitive circuit 231 at step 710, and waits for the time period $T_{PD}$ (i.e., 50 msec) at step 712 to allow the photosensitive diode current $I_{PD}$ to become representative of the total light intensity $L_{T-SNSR}$. The controller 230 then samples the total light intensity control signal $V_{TOT}$ (to generate a new total light intensity sample $S_{TOT}$) at step 714, and opens the controllable switch 235 to disable the photosensitive circuit 231 at step 716. The controller 230 increments a variable n by one at step 718 and stores the new total light intensity sample $S_{T-SNSR}$ as sample S[n] in the memory 246 at step 720. If the controller 230 has not yet collected the predetermined number $N_{SMPL}$ of samples during the present time interval at step 722, the variable transmission control procedure 700 simply exits without processing the samples S[n] stored in the memory 246.

When the controller 230 has collected the predetermined number $N_{SMPL}$ of samples during the present time interval at step 722, the controller 230 processes the samples S[n] stored in the memory 246 to determine if a digital message should be transmitted to the dimmer switch 110. The controller 230 first increments a variable q at step 724. The controller 230 uses the variable q to keep track of how many time intervals have occurred after the time interval in which the estimators were last calculated. The controller 230 then calculates the predicted light intensity values at step 726 using the estimators (i.e., the slope m and the offset b) from a previous time interval, i.e., $$P[i] = m \cdot i + b, \quad \text{(Equation 6)}$$

for $i = q \cdot T_{WIN} + 1$ to $2q \cdot T_{WIN}$.

At step 728, the controller 230 determines the mean-square error e between the measured light intensity values and the predicted light intensity values, i.e., $$e = (1/N_{MAX}) \cdot \Sigma (S[i] - P[i])^2, \quad \text{(Equation 7)}$$

for $i = q \cdot T_{WIN} + 1$ to $2q \cdot T_{WIN}$.

If the mean-square error e is less than a predetermined maximum error $e_{MAX}$ (e.g., approximately 15%) at step 730, the variable transmission control procedure 700 exits without transmitting a digital message to the dimmer switch 110.

However, if the mean-square error e is greater than or equal to the predetermined maximum error $e_{MAX}$ at step 730, the controller 230 then determines the new estimators at step 732 by performing a linear least-squares fit on the measured light intensities from the present time interval to thus determine the slope m and the offset b of the line that best represents the measured light intensities from the present time interval. The controller 230 loads a digital message including one or more values representative of the total light intensity $L_{T-SNSR}$ in the TX buffer at step 734. For example, the controller 230 may include the estimators (i.e., the slope m and the offset b) determined at step 732 in the digital message. Since the slope m and the offset b determined at step 732 represent the measured intensity values from the present time interval, the predicted intensity values determined in the next subsequent time interval will begin at time $T_{WIN}$, which is equal to the predetermined number $N_{SMPL}$ of samples per interval. Therefore, the controller 230 resets the variable n to $N_{SMPL}$ and the variable q to one at step 736, before the variable transmission control procedure 700 exits.

Figure 12:
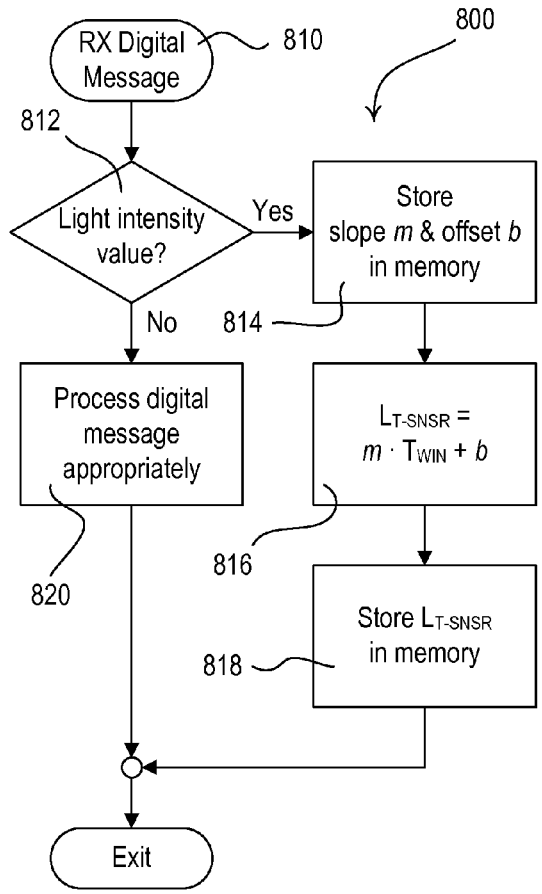
FIG. 12 is a simplified flowchart of a receive procedure executed by the controller of the dimmer switch of FIG. 1 according to the second embodiment of the present invention.

Since both the slope m and the offset b as determined by the daylight sensor 120 are transmitted to the dimmer switch 110, the dimmer switch is operable to continuously re-calculate (i.e., estimate) the total light intensity $L_{T\text{-}SNSR}$ as a function of time, and to adjust the present light intensity $L_{PRES}$ of the lighting load 104 in response to the estimated total light intensity $L_{T\text{-}SNSR}$. FIG. 12 is a simplified flowchart of a receive procedure 800 executed by the controller 214 of the dimmer switch 110 when a digital message is received from the daylight sensor 120 at step 810 according to the second embodiment of the present invention. If the received digital message includes light intensity values received from the daylight sensor 120 at step 812, the controller 214 stores the slope m and the offset b from the received digital message in the memory 216 at step 814. The controller 214 calculates the total light intensity $L_{T\text{-}SNSR}$ as measured the daylight sensor 120 at step 816 using the slope m and the offset b from the received digital message, as well as the predetermined period $T_{WIN}$ of each interval, i.e., $$L_{T\text{-}SNSR} = m \cdot T_{WIN} + b. \tag{Equation 8}$$

The controller 214 then stores the calculated total light intensity $L_{T\text{-}SNSR}$ in the memory 216 at step 818, before the receive procedure 800 exits. If the received digital message does not include light intensity values received from the daylight sensor 120 at step 812, the controller 214 processes the digital message appropriately at step 820 and the receive procedure 800 exits.

Figure 13:
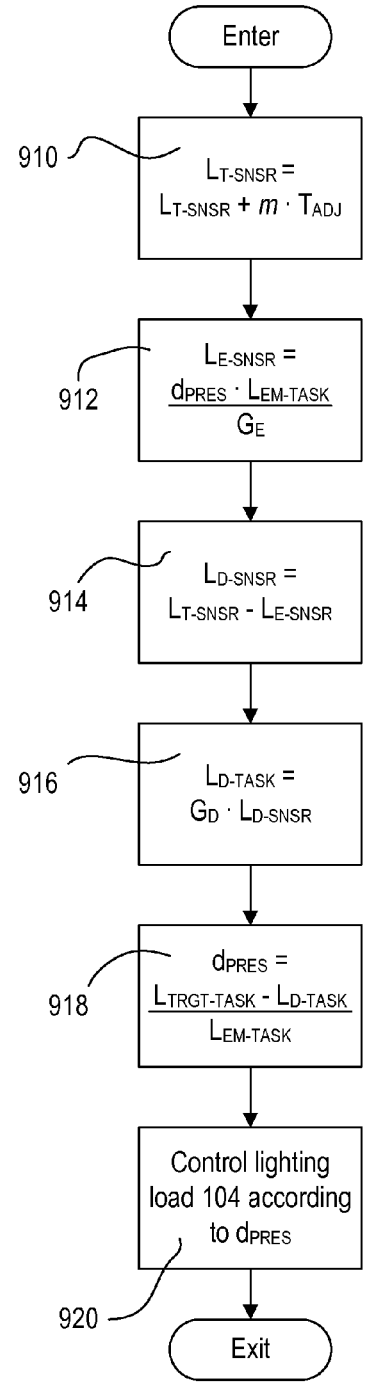
FIG. 13 is a simplified flowchart of a load control procedure executed periodically by the controller of the dimmer switch of FIG. 1 according to the second embodiment of the present invention.

FIG. 13 is a simplified flowchart of a load control procedure 900 executed by the controller 214 of the dimmer switch 110 periodically according to an adjustment period $T_{ADJ}$ (e.g., one second), such that the load control procedure 900 is executed once per second. The controller 214 first updates the total light intensity $L_{T\text{-}SNSR}$ (with respect to time) at step 910 using the slope m stored in the memory 216, i.e., $$L_{T\text{-}SNSR} = L_{T\text{-}SNSR} + m \cdot T_{ADJ}. \tag{Equation 9}$$

The controller 214 then determines the new present dimming percentage $d_{PRES}$ for the lighting load 104 in a similar manner as in the receive procedure 500 of the first embodiment. Specifically, the controller 214 calculates the light intensity $L_{E\text{-}SNSR}$ measured by the daylight sensor 120 from only the lighting load 104 at step 912, calculates the light intensity $L_{D\text{-}SNSR}$ at the daylight sensor 120 from only natural light at step 914, calculates the light intensity $L_{D\text{-}TASK}$ on the task surface from only daylight at step 916, and calculates the new present dimming percentage $d_{PRES}$ at step 918. The controller 214 then finally controls the lighting load 104 according to the new present dimming percentage $d_{PRES}$ at step 920, before the load control procedure 900 exits.

According to a third embodiment of the present invention, the controller 230 uses a parabolic model to determine the predicted light intensity values. In other words, the controller 230 is operable to perform a parabolic least-squares fit on the measured light intensity values from a present time interval to fit measured light intensity values to a parabola (i.e., $y=ax^2+bx+c$) that best represents the change in the measured light intensity values with respect to time. The controller 230 uses these estimators (i.e., the coefficients a, b, c of the parabola) to determine the predicted light intensity values for one or more of the subsequent time intervals. The controller 230 then determines a mean-square error e between the measured light intensity values and the predicted light intensity values.

Figure 14:
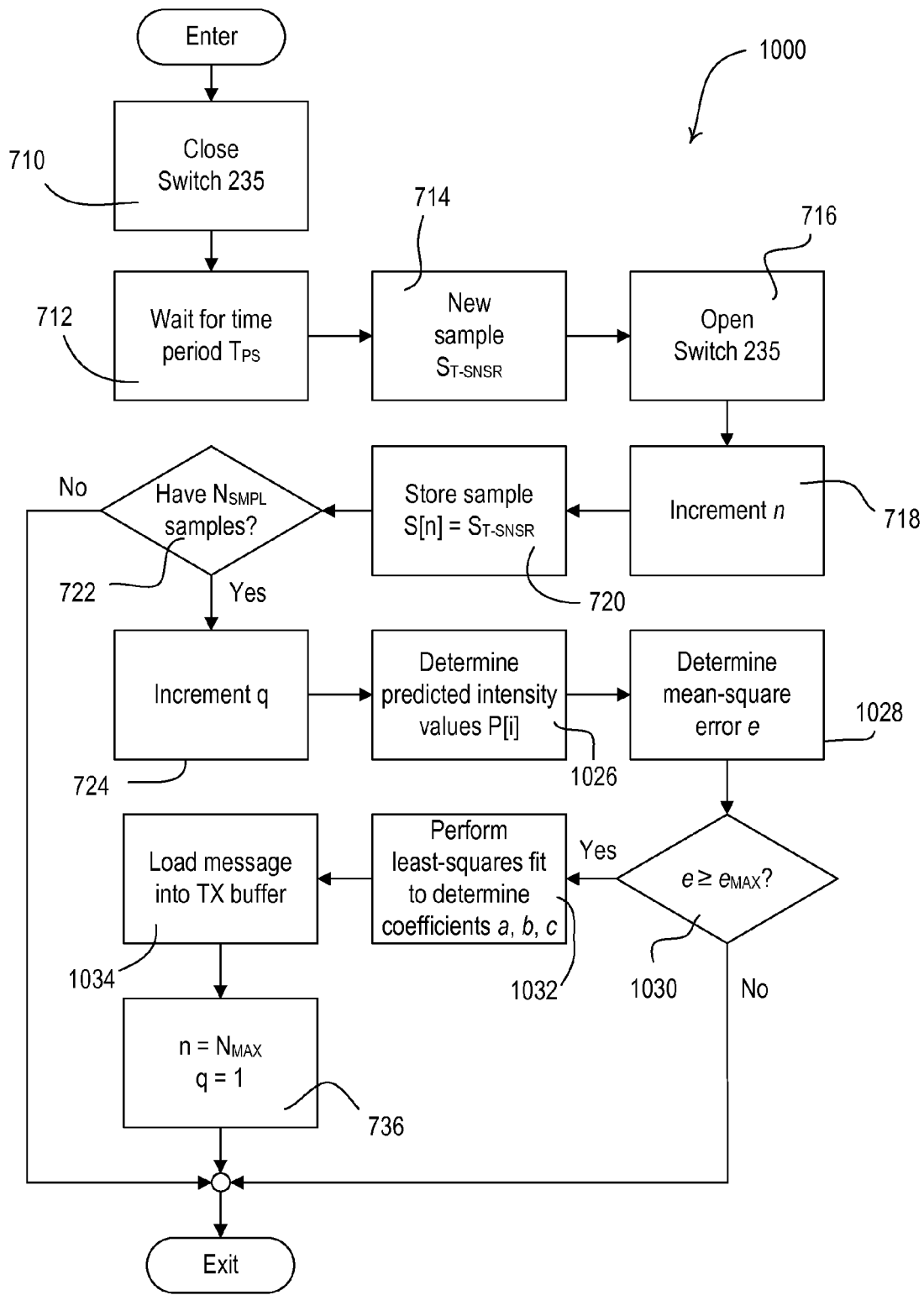
FIG. 14 is a simplified flowchart of a variable transmission control procedure executed by the controller of the daylight sensor of FIG. 1 according to a third embodiment of the present invention.

FIG. 14 is a simplified flowchart of a variable transmission control procedure 1000 executed by the controller 230 of the daylight sensor 120 periodically (e.g., approximately once every second) according to the third embodiment of the present invention. The variable transmission control procedure 1000 is very similar to the variable transmission control procedure 700 of the second embodiment. However, the controller 230 calculates the predicted light intensity values at step 1026 using the coefficients a, b, c (i.e., the estimators) and the parabola equation, i.e., $$P[i] = ai^2 + bi + c, \tag{Equation 10}$$

for $i = q \cdot T_{WIN} + 1$ to $2q \cdot T_{WIN}$.

At step 1028, the controller 230 determines the mean-square error e between the measured light intensity values and the predicted light intensity values. If the mean-square error e is greater than or equal to the predetermined maximum error $e_{MAX}$ at step 1030, the controller 230 determines the new estimators at step 1032 by performing a parabolic least-squares fit on the measured light intensities from the present time interval to thus determine the coefficients a, b, c of the parabola that best represent the measured light intensities from the present time interval. The controller 230 then loads a digital message including one or more values representative of the total light intensity $L_{T\text{-}SNSR}$ in the TX buffer at step 1034, e.g., the estimators (i.e., the coefficients a, b, c of the parabola) determined at step 1032. Accordingly, the dimmer switch 110 will execute a receive procedure (not shown) similar to the receive procedure 800 of the second embodiment in order to calculate the total light intensity $L_{T\text{-}SNSR}$ as measured by the daylight sensor 120 using the coefficients a, b, c. In addition, the dimmer switch 110 will periodically adjust the present light intensity $L_{PRES}$ of the lighting load 104 using a load control procedure (not shown) similar to the load control procedure 900 of the second embodiment.

According to another alternative embodiment of the present invention, the controller 230 of the daylight sensor 120 could use a linear predictor to determine the predicted light intensity values. For example, the predicted light intensity values may be calculated using the equation:

$$P[i] = -\Sigma(\alpha_i \cdot x[n-i]) \tag{Equation 11}$$

for $i = 1$ to K, where $x[n-i]$ are the previous measured light intensity values, $\alpha_i$ are the predictor coefficients, and K is the maximum number of values used to calculate the predicted light intensity.

According to a fourth embodiment of the present invention, the daylight sensor 120 does not transmit digital messages in response to the measured total light intensity $L_{T\text{-}SNSR}$ if the measured data is "misbehaving" so as to reduce the transmission rate and further conserve battery life. For example, the daylight sensor 120 may ignore fluctuations in the measured total light intensity $L_{T\text{-}SNSR}$ that are large in magnitude and short in time duration (i.e., during intermittent-cloudy days as shown in FIG. 3), such that the variable transmission rate of the daylight sensor is also dependent upon the rate of change of the total light intensity $L_{T\text{-}SNSR}$ measured by the daylight sensor (i.e., the "dynamic" change in the total light intensity). Specifically, the daylight sensor 120 does not transmit digital messages to the dimmer switch 110 if the total light intensity $L_{T\text{-}SNSR}$ has changed by more than a second predetermined percentage $\Delta S_{MAX2}$ during the predetermined time period $T_{WIN}$. Accordingly, the variable transmission rate of the daylight sensor 120 of the fourth embodiment of the present invention results in the average time between transmissions by the daylight sensor during the course of a day being greater than approximately 420 seconds (as determined by experimental study).

Figure 15:
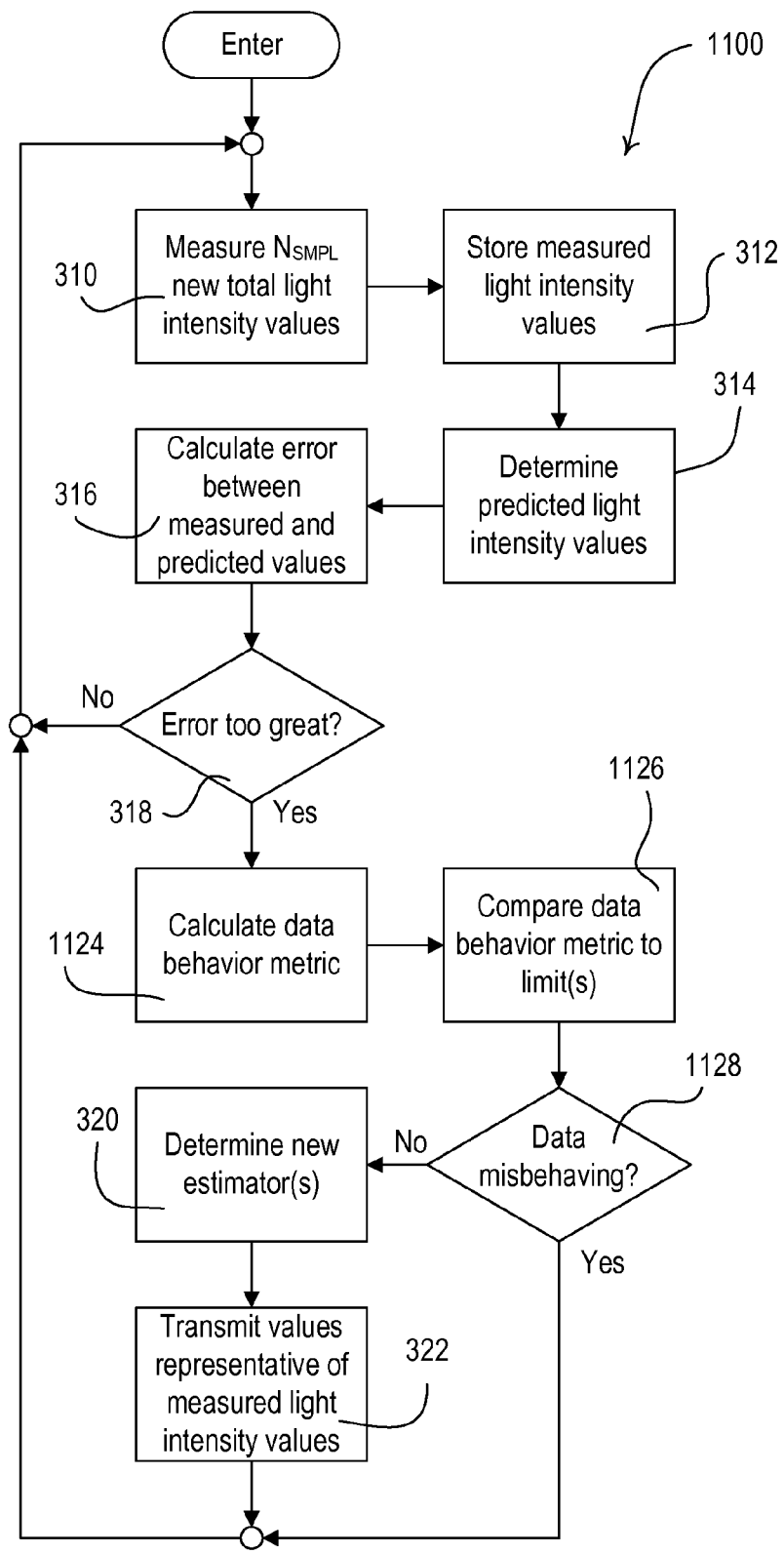
FIG. 15 is a simplified flowchart of a transmission algorithm executed by the controller of the daylight sensor of FIG. 1 according to a fourth embodiment of the present invention.

FIG. 15 is a simplified flowchart of a transmission algorithm 1100 executed by the controller 230 of the daylight sensor 120 according to the fourth embodiment of the present invention, such that the daylight sensor 120 transmits digital messages using the variable transmission rate. The transmission algorithm 1100 of the fourth embodiment is similar to the transmission algorithm 300 of the first, second, and third embodiments (as shown in FIG. 7). The controller 230 first measures and stores the predetermined number $N_{SMPL}$ of new total light intensity values at steps 310 and 312. Next, the controller 230 determines the predicted light intensity value(s) at step 314 using, for example, any of the estimators described with reference to the first through third embodiments, and calculates the error between the measured total light intensity values and the predicted total light intensity values at step 316.

However, according to the fourth embodiment, the controller 230 further analyzes the measured total light intensity values if the error calculated at step 316 is outside of the predetermined limits (i.e., is too great) at step 318. Specifically, the controller 230 using the measured total light intensity values to calculate a data behavior metric at step 1124, compares the calculated data behavior metric to predetermined data behavior metric limit(s) at step 1126, and determines if the data is misbehaving at step 1128, i.e., is outside of the data behavior metric limit(s). For example, the controller 230 may analyze the total light intensity values to determine if the rate of change of the total light intensity $L_{T\text{-}SNSR}$ measured by the daylight sensor 120 is too great. If the data is not misbehaving at step 1128, the controller 230 calculates the new estimator(s) for use during the subsequent time interval at step 320 and transmits a digital message including one or more values representative of the total light intensity $L_{T\text{-}SNSR}$ as measured by the daylight sensor 120 to the dimmer switch 110 at step 322, before the transmission algorithm 1100 loops around. If the data is misbehaving at step 1128, the controller 230 does not calculate the new estimator(s) at step 320 and does not transmit the values representative of the total light intensity $L_{T\text{-}SNSR}$ at step 324, but simply analyzes the next non-overlapping time interval.

Figure 16A:
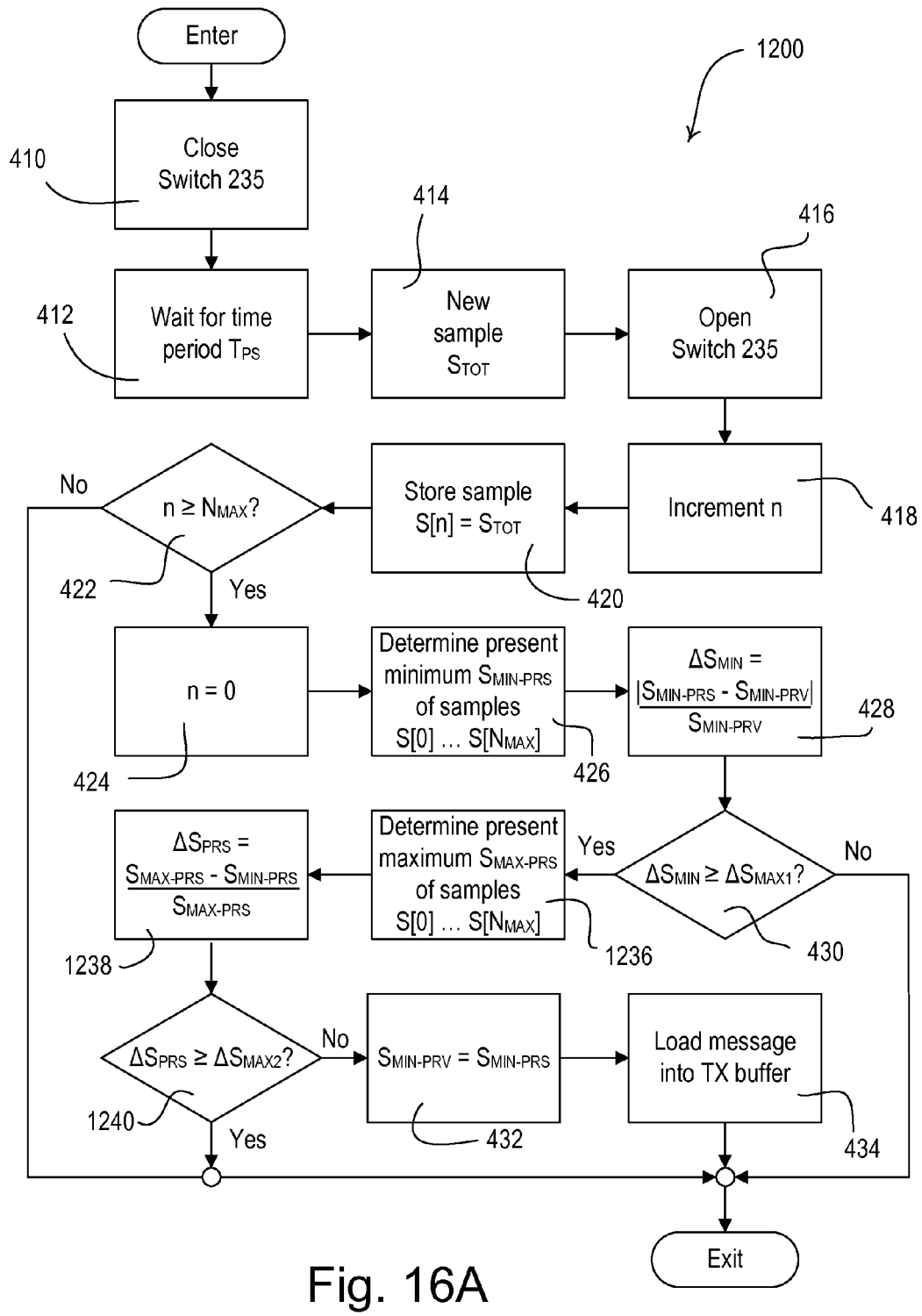
FIG. 16A is a simplified flowchart of a variable transmission control procedure executed by the controller of the daylight sensor of FIG. 1 according to the fourth embodiment of the present invention.

FIG. 16A is a simplified flowchart of a variable transmission control procedure 1200 executed by the controller 230 of the daylight sensor 120 periodically (e.g., approximately once every second) according to the fourth embodiment of the present invention. The variable transmission control procedure 1200 of the fourth embodiment is very similar to the variable transmission control procedure 400 of the first embodiment (as shown in FIG. 8). According to the fourth embodiment of the present invention, the controller 230 uses a single data point as the estimator (as in the first embodiment). However, the controller 230 could alternatively use a linear prediction model or a parabolic prediction model to determine the estimators as described above with reference to the second and third embodiments respectively.

Referring to FIG. 16A, if the minimum sample adjustment percentage $\Delta S_{MIN}$ is greater than or equal to the first predetermined percentage $\Delta S_{MAX1}$ at step 430, the controller 230 determines if the data (i.e., the samples S[n] stored in the memory 246) is misbehaving by determining if the total light intensity $L_{T\text{-}SNSR}$ has changed by more than the second predetermined percentage $\Delta S_{MAX2}$ during the present time period $T_{WIN}$. Specifically, the controller 230 determines a present maximum sample $S_{MAX\text{-}PRS}$ of the samples S[n] stored in the memory 246 (i.e., samples S[0] through S[$N_{SMPL}$]) at step 1236. The controller 230 then calculates a present sample adjustment amount $\Delta S_{PRS}$, which is representative of the rate of change of the total light intensity $L_{T\text{-}SNSR}$, at step 1238 using the equation:

$$\Delta S_{PRS} = \frac{S_{MAX-PRS} - S_{MIN-PRS}}{S_{MAX-PRS}}. \quad \text{(Equation 12)}$$

If the present sample adjustment amount $\Delta S_{PRS}$ is greater than or equal to the second predetermined percentage $\Delta S_{MAX2}$ at step 1240, the variable transmission control procedure 1200 exits without transmitting a digital message to the dimmer switch 110. For example, the second predetermined percentage $\Delta S_{MAX2}$ may be approximately 10%, but may alternatively range from approximately 5% to 25%.

However, if the present sample adjustment amount $\Delta S_{PRS}$ is less than the second predetermined percentage $\Delta S_{MAX2}$ at step 1240, the controller 230 sets the previous minimum sample $S_{MIN\text{-}PRV}$ equal to the present minimum sample $S_{MIN\text{-}PRS}$ at step 432. The controller 230 then loads a digital message including a value representative of the total light intensity $L_{T\text{-}SNSR}$ as measured by the daylight sensor 120 (i.e., the minimum present minimum sample $S_{MIN\text{-}PRS}$) in a transmit (TX) buffer at step 434, before the variable transmission control procedure 1200 exits.

Figure 16B:
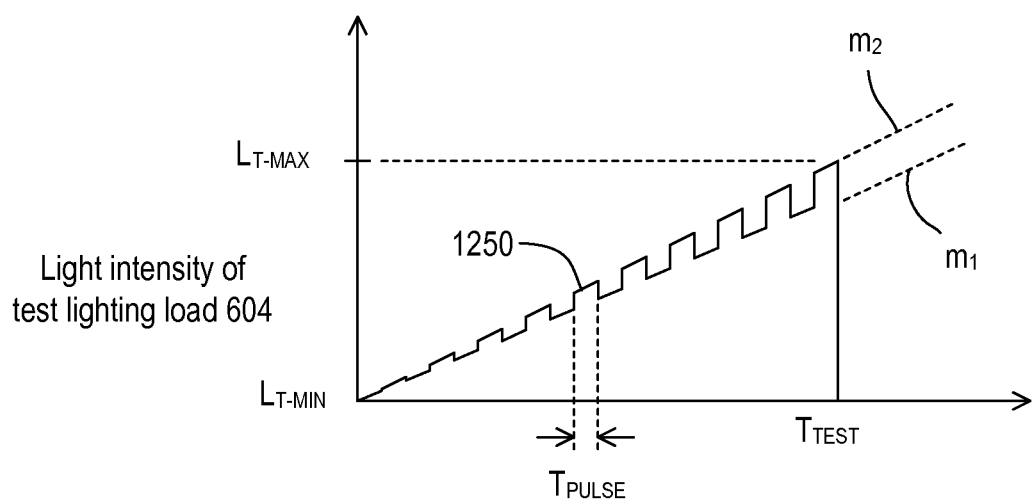
FIG. 16B is a plot of an example test waveform for the daylight sensor of FIG. 1 according to the fourth embodiment to be used in the test setup shown in FIG. 10B.

FIG. 16B is a plot of an example test waveform 1250 for the daylight sensor 120 of the fourth embodiment to be used in the test setup 650 shown in FIG. 10B. The test waveform 1250 comprises a pulsed waveform added on top of a linear ramp waveform and has peaks and valleys, such that the text waveform models the total light intensity $L_{T\text{-}SNSR}$ as measured by the daylight sensor 120 on an intermittent-cloudy day. The test waveform 1250 has a minimum light intensity (during the valleys) that increases with respect to time at a first slope $m_1$, and a maximum light intensity (during the peaks) that increases with respect to time at a second slope $m_2$. Each of the peaks (during which the text waveform 1250 is at the maximum light intensity) have a length $T_{PULSE}$, which may be approximately five seconds. The magnitude of the test waveform 1250 during the valleys is approximately 15% of the magnitude of the test waveform during the peaks. When the test waveform 1250 is used in the test setup 650 to control the test lighting load 604, the daylight sensor 120 of the fourth embodiment will not transmit digital messages in response to the temporary excursions of the light intensity during the peaks. Accordingly, the rate of transmission of the daylight sensor 120 of the fourth embodiment will remain constant at a rate determined by the slope $m_1$ of the valleys.

As described above, the controller 230 of the daylight sensor 120 of the first, second, third, and fourth embodiments collects the predetermined number $N_{SMPL}$ of measurements of the total light intensity $L_{T\text{-}SNSR}$ during consecutive non-overlapping time intervals, and only analyzes the measurements at the end of each time interval (i.e., as determined by the predetermined time period $T_{WIN}$). Alternatively, the controller 230 could analyze the measurements of the total light intensity $L_{T\text{-}SNSR}$ in a sliding window time interval. Specifically, the controller 230 could store each new measurement of the total light intensity $L_{T\text{-}SNSR}$ in a first-in, first-out (FIFO) register (e.g., having a size equal to the predetermined number $N_{SMPL}$ of measurements). The controller 230 could then analyze the data stored in the FIFO registered each time that the controller samples the total light intensity control signal $V_{TOT}$.

In addition, the controller 230 of the daylight sensor 120 transmits digital messages including one or more values representative of the measured total light intensity $L_{T\text{-}SNSR}$ according to the first, second, third, and fourth embodiments. According to a fifth embodiment of the present invention, each digital message transmitted by the daylight sensor 120 to the dimmer switch 110 may alternatively comprise a command, such as a specific new light intensity $L_{NEW}$ for the lighting load 104. The controller 230 of the daylight sensor 120 determines the new intensity levels $L_{NEW}$ in response to the measured total light intensity $L_{T\text{-}SNSR}$. The dimmer switch 110 controls the present light intensity $L_{PRES}$ of the lighting load 104 to the new light intensity $L_{NEW}$ in response to receiving a digital message with a command from the daylight sensor 120.

According to the fifth embodiment, each time the controller 230 of the daylight sensor 120 samples the total light intensity control signal $V_{TOT}$, the controller 230 calculates a new dimming percentage $d_{NEW}$, which may be transmitted to the dimmer switch 110. As in the previous embodiments, the new dimming percentage $d_{NEW}$ may be a number between zero and one, which is representative of the new light intensity $L_{NEW}$ for the lighting load 104. The controller 214 of the dimmer switch 110 is operable to determine the light intensity $L_{NEW}$ from the new dimming percentage $d_{NEW}$ received from the daylight sensor 120, for example, by applying the new dimming percentage $d_{NEW}$ to different dimming curves depending upon the load type of the lighting load. The controller 230 of the daylight sensor 120 only transmits digital messages to the dimmer switch 110 when the new dimming percentage $d_{NEW}$ is outside a deadband, i.e., only when a change to the present light intensity $L_{PRES}$ of the lighting load 104 is required. Accordingly, the daylight sensor 120 only transmits digital messages to the dimmer switch 110 using a variable transmission rate that is dependent upon the measured total light intensity $L_{T\text{-}SNSR}$.

In addition, the controller 230 may also store a historical record of the total light intensity $L_{T\text{-}SNSR}$ as measured by the daylight sensor 120 each time the controller samples the total light intensity control signal $V_{TOT}$. The controller 230 is operable to determine when it is daytime and nighttime in response to the total light intensity control signal $V_{TOT}$ and the historical record stored in the memory 246. The controller 230 may increase the length of the sampling period $T_{SMPL}$ (e.g., to approximately three seconds) during the nighttime, such that the controller samples the total light intensity control signal $V_{TOT}$ less frequently and consumes even less power.

Figure 17:
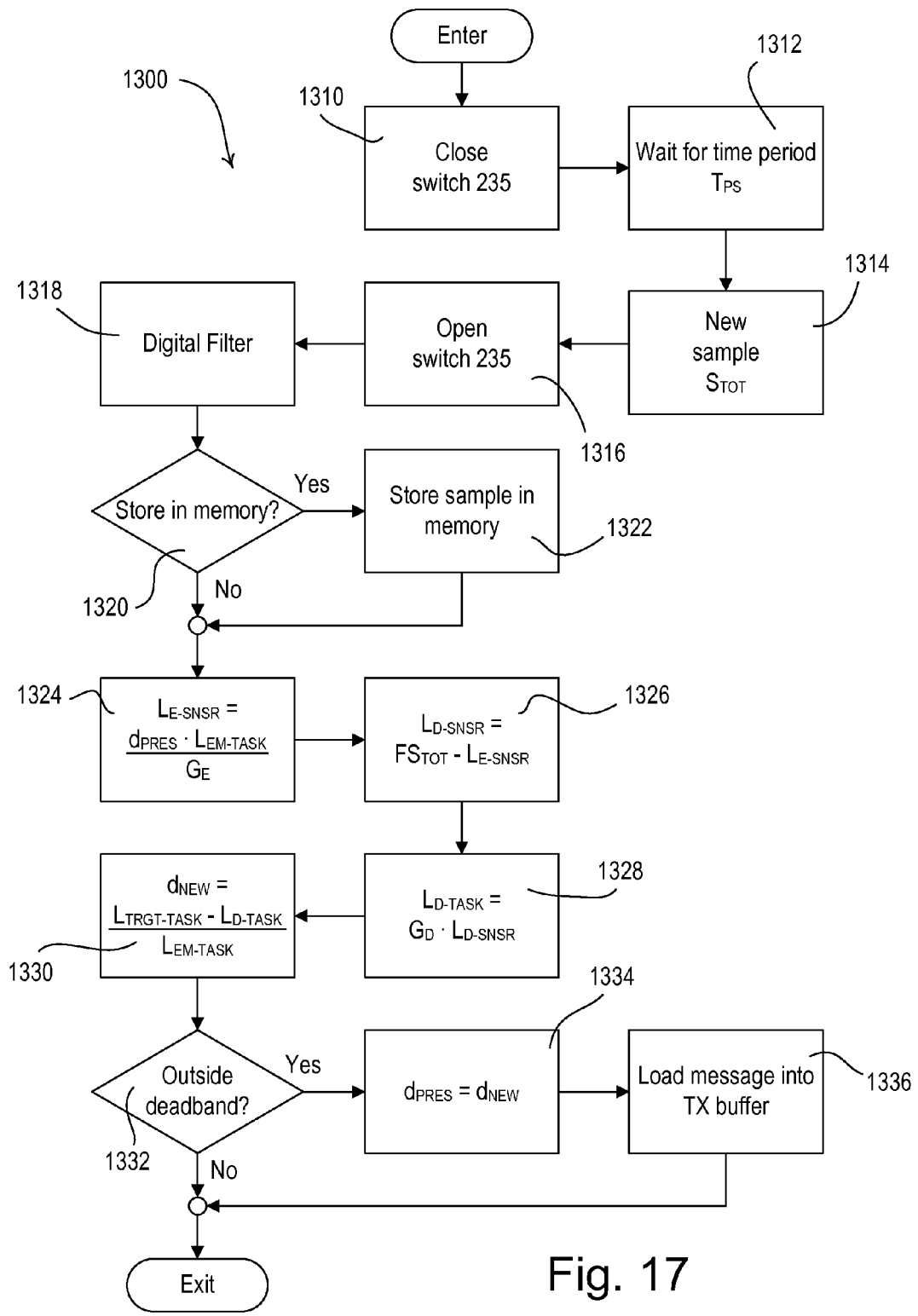
FIG. 17 is a simplified flowchart of a control procedure executed periodically by the controller of the daylight sensor of FIG. 1 according to a fifth embodiment of the present invention.

FIG. 17 is a simplified flowchart of a control procedure 1300 executed periodically (e.g., every one to three seconds) by the controller 230 of the daylight sensor 120 according to the fifth embodiment of the present invention. At step 1310, the controller 230 enables the photosensitive circuit 231 by closing the switch 235 using the photosensitive circuit enable control signal $V_{PS\_ENABLE}$. The controller 230 waits for the time period $T_{PD}$ (i.e., 50 msec) at step 1312 to allow the photosensitive diode current $I_{PD}$ to become representative of the total light intensity $L_{T\text{-}SNSR}$ at the daylight sensor 120. The controller 230 then samples the total light intensity control signal $V_{TOT}$ (using the ADC) to generate a new total light intensity sample $S_{TOT}$ at step 1314, and disables the photosensitive circuit 231 by opening the switch 235 using the photosensitive circuit enable control signal $V_{PS\_ENABLE}$ at step 1316. At step 1318, the total light intensity sample $S_{TOT}$ is applied to a digital filter (such as a linear predictor) to generate a filtered total light intensity sample $FS_{TOT}$.

The controller 230 is operable to periodically store the filtered total light intensity samples $FS_{TOT}$ (e.g., every 30 minutes) to create the historical record in the memory 246 of the total light intensity $L_{T\text{-}SNSR}$ at the daylight sensor 120. Specifically, if the controller 230 should store the present filtered total light intensity sample $FS_{TOT}$ at step 1320, the controller stores the present filtered total light intensity sample $FS_{TOT}$ in the memory 246 at step 1322.

Next, the controller 230 uses the filtered total light intensity sample $FS_{TOT}$ and a present dimming percentage $d_{PRES}$ to determine the new dimming percentage $d_{NEW}$ for the lighting load 104 using similar calculations as the receive procedure 500 of the first embodiment. Specifically, the controller 230 calculates the light intensity $L_{E\text{-}SNSR}$ measured by the daylight sensor 120 from only the lighting load 104 at step 1324, calculates the light intensity $L_{D\text{-}SNSR}$ at the daylight sensor 120 from only natural light at step 1326, calculates the light intensity $L_{D\text{-}TASK}$ on the task surface from only daylight at step 1328, and calculates the new dimming percentage $d_{NEW}$ at step 1330.

At step 1332, the controller 230 determines if the new dimming percentage $d_{NEW}$ is outside of a deadband, e.g., $$d_{PRES}-\Delta < d_{NEW} < d_{PRES}+\Delta, \qquad (\text{Equation 13})$$

where $\Delta$ represents a predetermined increment by which the new dimmer percentage $d_{NEW}$ must differ from the present dimming percentage $d_{PRES}$ before the daylight sensor 120 will transmit a digital message to the dimmer switch 110 causing the dimmer switch to adjust the intensity of the lighting load 104 to the new intensity $L_{NEW}$. For example, the predetermined increment $\Delta$ may be approximately 1%. If the new dimming percentage $d_{NEW}$ is within the deadband at step 1332, the control procedure 1300 simply exits. However, if the new dimming percentage $d_{NEW}$ is outside the deadband at step 1332, the controller 230 stores the new dimming percentage $d_{NEW}$ as the present dimming percentage $d_{PRES}$ at step 1334. The controller 230 loads a digital message (including a command to control the intensity of the lighting load 104 according to the new dimming percentage $d_{NEW}$) into a transmit (TX) buffer at step 1336, before the control procedure 1300 exits.

A lighting control systems including wired daylight sensors (i.e., wired photosensors) is described in greater detail in U.S. Pat. No. 7,369,060, issued May 6, 2008, entitled DISTRIBUTED INTELLIGENCE BALLAST SYSTEM AND EXTENDED LIGHTING CONTROL PROTOCOL, the entire disclosures of which is hereby incorporated by reference.

Figure 18:
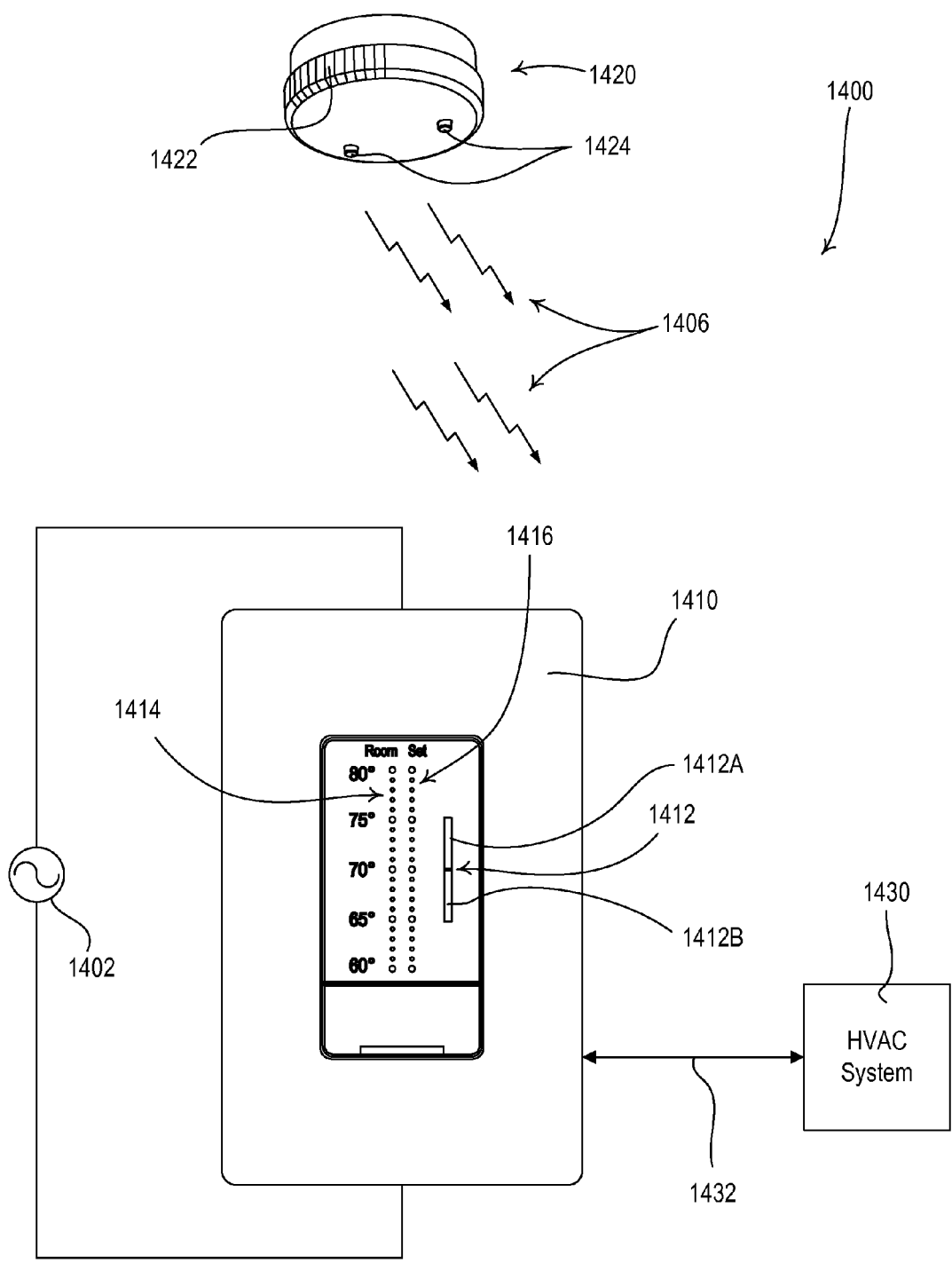
FIG. 18 is a simple diagram of a wireless temperature control system comprising a temperature control device and a wireless temperature sensor according to a sixth embodiment of the present invention.

FIG. 18 is a simple diagram of wireless temperature control system 1400 comprising a temperature control device 1410 and a wireless temperature sensor 1420 according to a sixth embodiment of the present invention. The temperature sensor 1410 is operable to measure a parameter, e.g., a present temperature $t_{PRES}$ in the space in which the sensor is located, and transmit digital messages including data representative of the present temperature $t_{PRES}$ to the temperature control device 1410 via RF signals 1406. The temperature control device 1410 is operable to control a heating, ventilation, and air conditioning (HVAC) system 1430 (i.e., a heating and/or cooling system) to control the present temperature $t_{PRES}$ in the space towards a setpoint temperature $t_{SET}$. The temperature control device 1410 is powered from an AC power source 1402, but could alternatively be powered from a DC power supply. The temperature control device 1410 may be coupled to the HVAC system 1430 via an HVAC communication link 1432, e.g., a digital communication link (such as an RS-485 link, an Ethernet link, or a BACnet® link), or alternatively via a wireless communication link (such as an RF communication link). The temperature control device 1410 transmits appropriate digital messages to the HVAC system 1430 to control the present temperature $t_{PRES}$ in the building towards the setpoint temperature $t_{SET}$. Alternatively, the HVAC communication link 1432 could comprise a more traditional analog control link for simply turning the HVAC system 1430 on and off.

The temperature control device 1410 includes a temperature adjustment actuator 1412, which may comprise, for example, a vertically-arranged linear rocker switch. Actuations of an upper portion 1412A of the temperature adjustment actuator 1412 cause the temperature control device 1410 to increase the setpoint temperature $t_{SET}$, while actuations of a lower portion 1412B of the temperature adjustment actuator cause the temperature control device to decrease the setpoint temperature $t_{SET}$. The temperature control device 1410 further comprises a room temperature visual display 1414 for displaying a visual representation of the present temperature $t_{PRES}$ in the room as measured by the wireless temperature sensor 1420, and a setpoint temperature visual display 1416 for displaying a visual representation of the setpoint temperature $t_{SET}$ of the temperature control device 1410. The room temperature visual display 1414 and the setpoint temperature visual display 1416 may each comprise, for example, a linear array of LEDs as shown in FIG. 18. The temperature control device 1410 and wireless temperature sensor 1420 are described in greater detail in commonly-assigned U.S. patent application Ser. No. 13/234,440, filed Sep. 16, 2011, entitled WALL-MOUNTABLE TEMPERATURE CONTROL DEVICE FOR A LOAD CONTROL SYSTEM HAVING AN ENERGY SAVINGS MODE, the entire disclosure of which is hereby incorporated by reference.

The wireless temperature sensor 1420 may also be battery-powered and may be mounted remotely in a location away from or right next to the temperature control device 1410. The wireless temperature sensor 1420 comprises an internal temperature sensing circuit 1532 (FIG. 19) for measuring the present temperature $t_{PRES}$ in the room at the location away from the temperature control device 1410. The wireless temperature sensor 1420 comprises vents 1422, which allow for air flow from the outside of the temperature sensor to the internal temperature sensing device inside the temperature sensor. The vents 1422 help to improve the accuracy of the measurement of the present temperature $t_{PRES}$ in the room in which the wireless temperature sensor 1420 is mounted (i.e., of the temperature outside the wireless temperature sensor). The wireless temperature sensor 1420 further comprises actuators 1424 for associating the wireless temperature sensor with the temperature control device 1410 and for configuring the wireless temperature sensor. The wireless temperature sensor 1420 is operable to transmit digital messages regarding the measured temperature to the temperature control device 1410 via the RF signals 1406 using a variable transmission rate that is dependent upon the amount of change in the present temperature $t_{PRES}$ as measured by the temperature sensor. In response to receiving the RF signals 1406 from the wireless temperature sensor 1420, the temperature control device is operable to update the room temperature visual display 1414 to display the present temperature $t_{PRES}$ of the room and to control the HVAC system 1430, so as to adjust the present temperature $t_{PRES}$ in the room towards the setpoint temperature $t_{SET}$.

Figure 19:
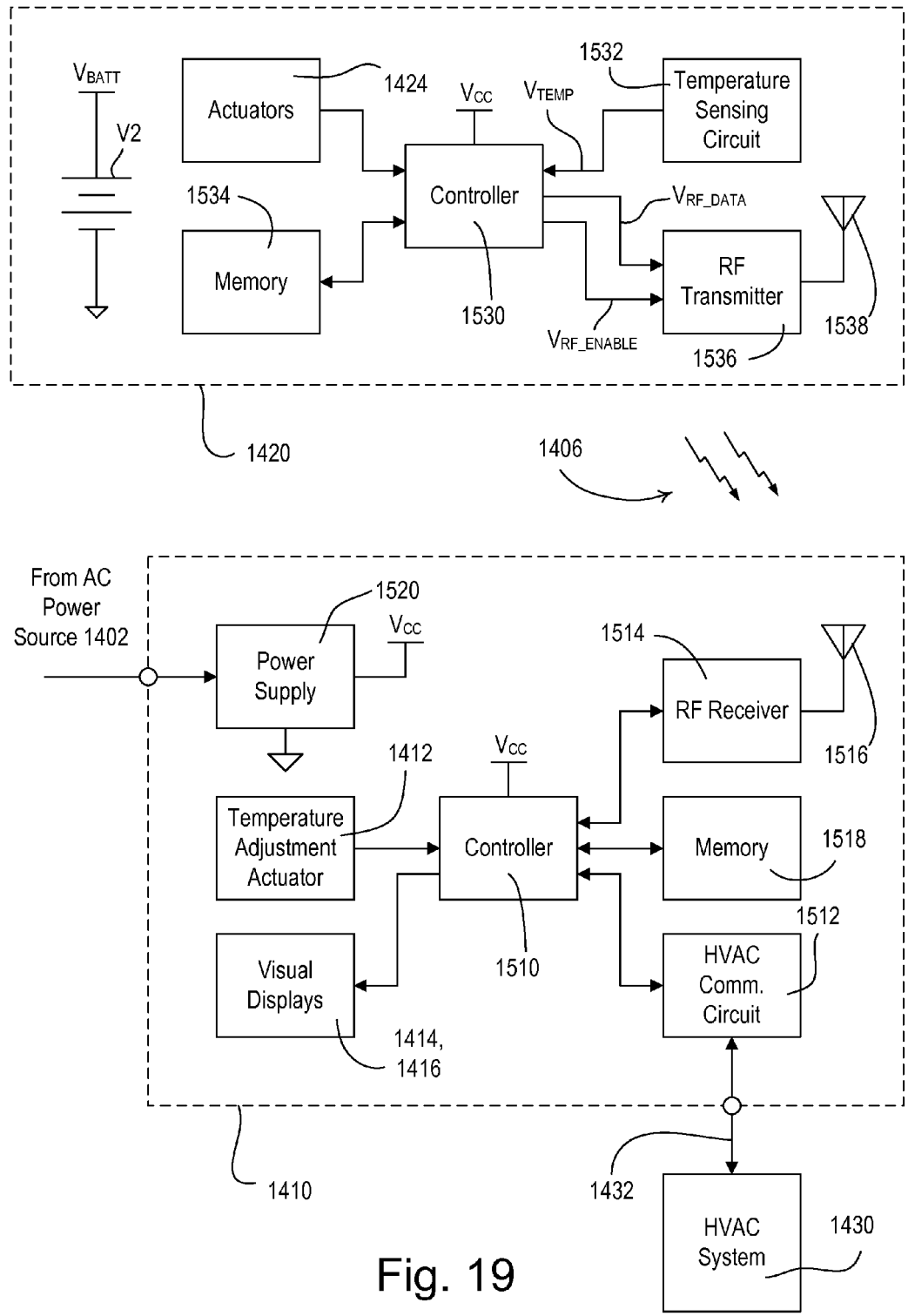
FIG. 19 is a simplified block diagram of the temperature control device and the wireless temperature sensor of the wireless temperature control system of FIG. 18.

FIG. 19 is a simplified block diagram of the temperature control device 1410 and the wireless temperature sensor 1420 according to the sixth embodiment of the present invention. The temperature control device 1410 comprises a controller 1510, which may be implemented as, for example, a microprocessor, a microcontroller, a programmable logic device (PLD), an application specific integrated circuit (ASIC), or any suitable processing device. The controller 1510 is coupled to an HVAC communication circuit 1512 (e.g., a digital communication circuit, such as an RS-485 or an Ethernet communication circuit), which is connected to the HVAC communication link 1432 to allow the controller to adjust the operation of the HVAC system 1430. If the HVAC communication link 1432 comprises an analog control link, the HVAC communication circuit 1512 could simply comprise a switching device for enabling and disabling the HVAC system 1430.

The controller 1510 is coupled to a wireless communication circuit, e.g., an RF receiver 1514, which is coupled to an antenna 1516 for transmitting and receiving the RF signals 1406. The controller 1510 is operable to determine the present temperature $t_{PRES}$ in the building in response to the RF signals 1406 received from the wireless temperature sensor 1420. The temperature control device 1410 further comprises a memory 1518 for storage of the setpoint temperature $t_{SET}$ and the present temperature $t_{PRES}$ in the building. The memory 1518 may be implemented as an external integrated circuit (IC) or as an internal circuit of the controller 1415. A power supply 1520 receives power from the AC power source 1402 and generates a DC supply voltage $V_{CC}$ for powering the controller 1510 and other low-voltage circuitry of the temperature control device 1410. The controller 1510 is coupled to the temperature adjustment actuator 1412, for adjusting the operation of the HVAC system 1430 in response to actuations of the temperature adjustment actuator. The controller 1510 is coupled to the room temperature visual display 1414 and the setpoint temperature visual display 1416 for displaying the present temperature $t_{PRES}$ and the setpoint temperature $t_{SET}$, respectively.

The temperature sensor 1420 comprises a controller 1530 that is coupled to the temperature sensing circuit 1532 for determining the present temperature $t_{PRES}$ in the space around the sensor. The temperature sensing circuit 1532 provides the controller 1530 with a temperature control signal $V_{TEMP}$ representative of the present temperature $t_{PRES}$. The controller 1530 is coupled to the actuators 1424 for associating the temperature sensor 1420 with the temperature control device 1410 and for configuring the operation of the temperature sensor. The controller 1530 is further coupled to a memory 1534 for storing operational characteristics of the temperature sensor 1420. The temperature sensor 1420 further comprises an RF transmitter 1536 and an antenna 1538 for transmitting digital messages to the temperature control device 1410 via the RF signals 1406 in response to the temperature control signal $V_{TEMP}$. The controller 1530 provides the digital messages to be transmitted by the RF transmitter 1536 via an RF data control signal $V_{RF\_DATA}$ and enables the RF transmitter via an RF enable control signal $V_{RF\_ENABLE}$. Alternatively, the RF receiver 1514 of the temperature control device 1410 and the RF transmitter 1536 of the wireless temperature sensor 1420 could both comprise RF transceivers to allow for two-way communication between the temperature control device and the wireless temperature sensor.

The controller 1530 is operable to sample the temperature control signal $V_{TEMP}$ at a sampling period $T_{T-SMPL}$ (e.g., approximately 125 msec) using an ADC to generate a temperature sample $S_{TEMP}$. Specifically, the controller 1530 is operable to sample the temperature control signal $V_{TEMP}$ a predetermined number $N_{T-SMPL}$ of times (e.g., 16 times) and then average the readings to generate the temperature sample $S_{TEMP}$. Thus, the temperature sample $S_{TEMP}$ is generated every two seconds and is stored in the memory 1534, such that a number $N_S$ (e.g., approximately 30) of the temperature samples $S_{TEMP}$ are stored in the memory. The controller 1530 then calculates a sliding average value Y[n] of the temperature samples $S_{TEMP}$ stored in the memory 1534, i.e., $$Y[n] = \frac{1}{N_S} \sum S_{TEMP}[n-i], \quad \text{(Equation 14)}$$

for $i = 0$ to $N_S - 1$, where n is the sample number and $N_S$ is the window width (e.g., approximately 30). Accordingly, the sliding average value Y[n] of the samples is simply the average of the previous number $N_S$ of temperature samples $S_{TEMP}$. The controller 1530 stores the sliding average value Y[n] of the samples in the memory 1534, such that at least a number $N_Y$ (e.g., approximately 30) of the sliding average value Y[n] of the samples are stored in the memory.

The controller 1530 is operable to transmit digital messages to the temperature control device 1410 using the variable transmission rate that is dependent upon the amount of change in the present temperature $t_{PRES}$ as measured by the temperature sensing circuit 1532. The controller 1530 determines a predicted temperature value $Y_P$ using one or more estimators and calculates an error between the predicted temperature value $Y_P$ and the most recent sliding average value Y[n] of the samples. According to the sixth embodiment of the present invention, the controller 1530 uses a linear prediction model to determine the predicted light intensity values, where the estimators comprise a slope m and an offset b of a line that best represents the change of the value of the present temperature $t_{PRES}$. The controller 1530 stores the slope m and the offset b in the memory 1534 and uses the slope m and the offset b to calculate the predicted temperature value $Y_P$, i.e., $$Y_P = m \cdot T_{CALC} + b, \quad \text{(Equation 15)}$$

where $T_{CALC}$ is a calculation period (e.g., approximately 30 seconds).

When an error $e_Y$ between the predicted temperature value $Y_P$ and the most recent sliding average value Y[n] of the samples is too great, the controller 1530 recalculates the slope m and the offset b considering the previous one-minute interval, i.e., $$m = Y[n] - Y[n-30], \text{ and} \quad \text{(Equation 16)}$$

$$b = Y[n-30], \quad \text{(Equation 17)}$$

where Y[n−30] equals the sliding average value from one minute ago (since the sliding average values are calculated every two seconds). The controller 1530 then transmits a digital message including the slope m and the offset b to the temperature control device 1410. Alternatively, the controller 1530 could use a single data point as the estimator (as in the first embodiment) to determine the predicted temperature value $Y_P$.

The temperature control device 1410 is operable to continuously re-calculate an estimated temperature value $Y_{EST}$ as a function of time using the slope m and the offset b received from the temperature sensor 1420. The estimated temperature value $Y_{EST}$ is representative of (e.g., approximately equal to) the present temperature $t_{PRES}$ measured by the temperature sensor 1420. The temperature control device 1410 is then operable to control the HVAC system 1430 in response to the estimated temperature value $Y_{EST}$. Since the temperature control device 1410 is operable to continuously update the estimated temperature value $Y_{EST}$ as a function of time, the temperature sensor 1420 only needs to transmit updated values of the slope m and the offset b when the present temperature $t_{PRES}$ measured by the temperature sensor 1420 deviates from the line represented by the slope m and the offset b.

Figure 20:
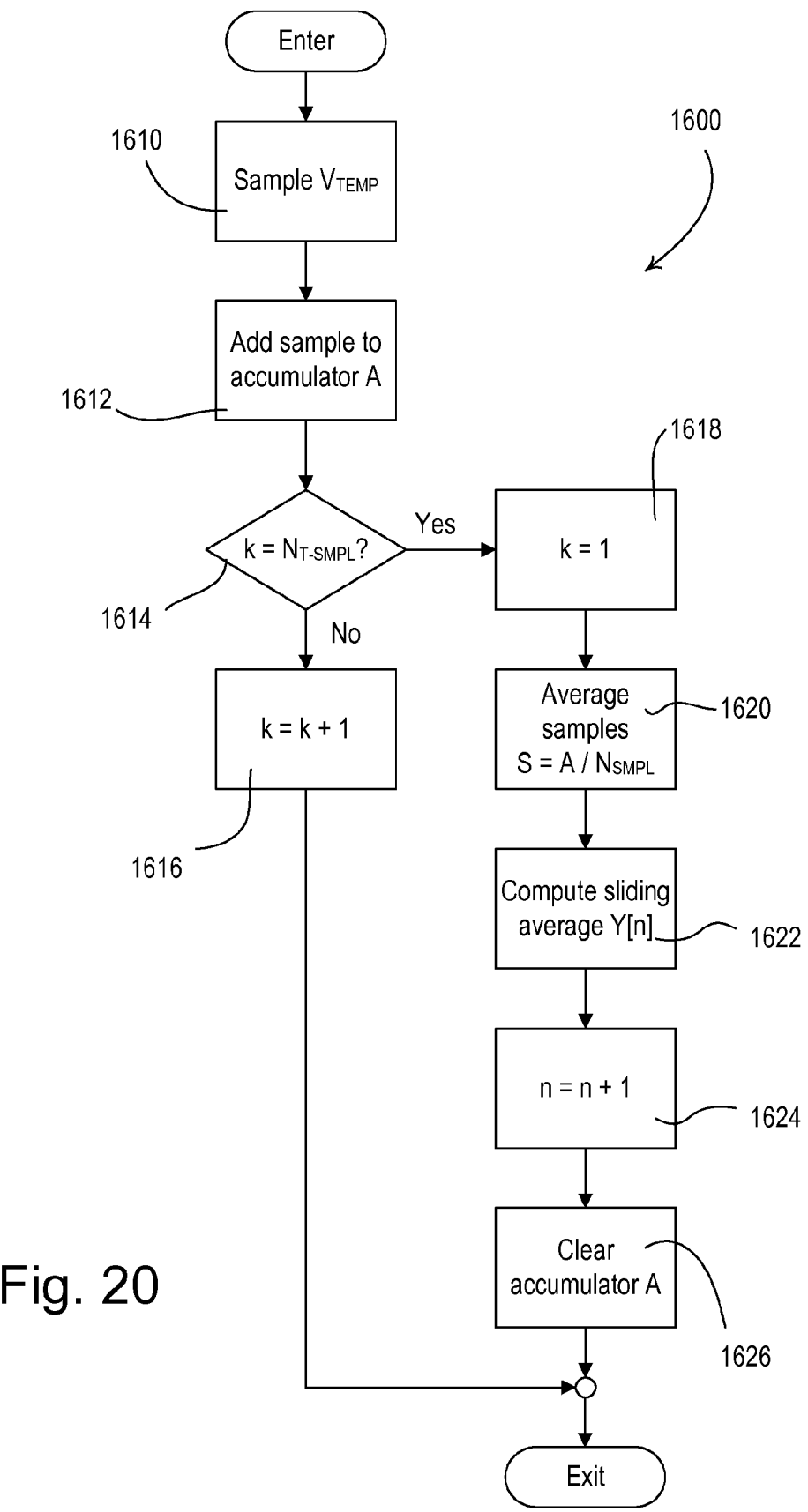
FIG. 20 is a simplified flowchart of a sampling procedure executed periodically by a controller of the temperature sensor of FIG. 19.

FIG. 20 is a simplified flowchart of a sampling procedure 1600 executed by the controller 1530 of the temperature sensor 1420 periodically at the sampling period $T_{T-SMPL}$ (e.g., approximately once every 125 msec). The controller 1530 samples the temperature control signal $V_{TEMP}$ at step 1610 and adds the sample to an accumulator A at step 1612. The controller 1530 uses a variable k to keep track of how many times the controller has sampled the temperature control signal $V_{TEMP}$. If the variable k is not equal to the predetermined number $N_{T-SMPL}$ of times (i.e., 16 times) at step 1614, the controller 1530 increments the variable k at step 1616 and the sampling procedure 1600 exits. When the controller 1530 has sampled the temperature control signal $V_{TEMP}$ the predetermined number $N_{T-SMPL}$ of times at step 1614, the controller 1530 sets the variable k equal to one at step 1618, and averages the last predetermined number $N_{T-SMPL}$ of samples at step 1620 by dividing the value of the accumulator A by the predetermined number $N_{T-SMPL}$. The controller 1530 then computes the sliding average value Y[n] of the samples at step 1622 using Equation 14 as shown above and then increments the sample number n at step 1624. Finally, the controller 1530 clears the accumulator A at step 1626 and the sampling procedure 1600 exits.

Figure 21:
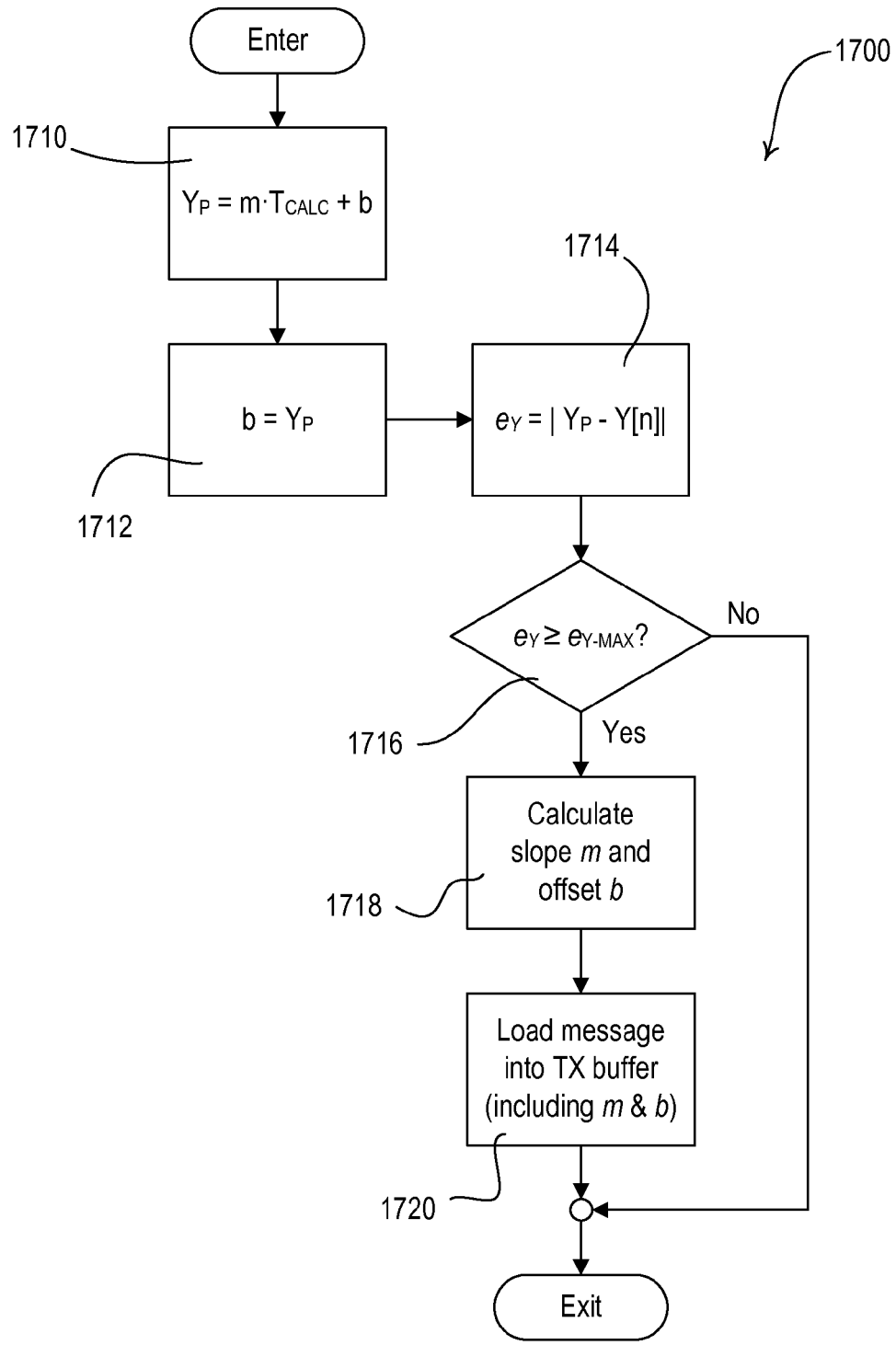
FIG. 21 is a simplified flowchart of a variable transmission control procedure executed periodically by the controller of the temperature sensor of FIG. 19.

FIG. 21 is a simplified flowchart of a variable transmission control procedure 1700 executed by the controller 1530 of the temperature sensor 1420 periodically (e.g., approximately once every thirty seconds) according to the sixth embodiment of the present invention. At step 1710, the controller 1530 calculates the predicted temperature value $Y_P$ using Equation 15 shown above. At step 1712, the controller 1530 sets the offset b equal to the predicted temperature value $Y_P$ (as calculated at step 1710), such that the next time that the controller 1530 calculates the predicted temperature value $Y_P$, the offset b will be equal to the previous predicted temperature value. The controller 1530 then calculates the error $e_Y$ between the between the predicted temperature value $Y_P$ and the present sliding average value Y[n] of the samples at step 1714, i.e., $$e_Y = |Y_P - Y[n]|. \quad \text{(Equation 18)}$$

If the error $e_Y$ is less than a maximum error $e_{Y-MAX}$ at step 1716, the variable transmission control procedure 1700 simply exits. However, if the error $e_Y$ is greater than or equal to the maximum error $e_{Y-MAX}$ at step 1716, the controller 1530 calculates new values for the slope m and the offset b at step 1718 using the sliding average values Y[n] stored in the memory 1534 and Equations 16 and 17 shown above. The controller 1530 then loads a digital message including the slope m and the offset b into the TX buffer at step 1720, and the variable transmission control procedure 1700 exits.

Figures 22, 23:
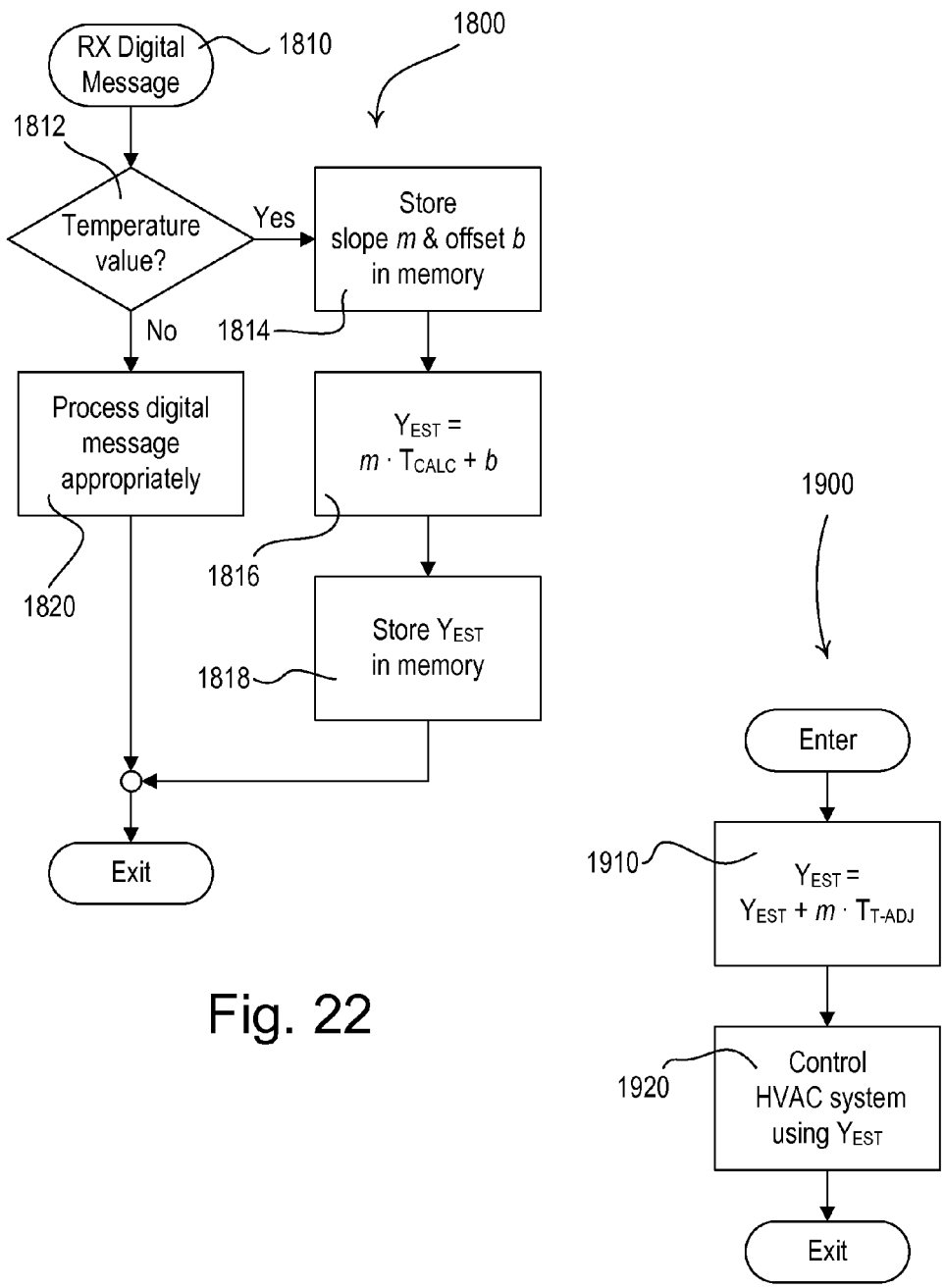
FIG. 22 is a simplified flowchart of a receive procedure executed by a controller of the temperature control device of FIG. 19.
FIG. 23 is a simplified flowchart of a temperature estimation procedure executed periodically by the controller of the temperature control device of FIG. 19.

FIG. 22 is a simplified flowchart of a receive procedure 1800 executed by the controller 1510 of the temperature control device 1410 when a digital message is received from the temperature sensor 1420 at step 1810 according to the sixth embodiment of the present invention. If the received digital message includes temperature values from the temperature sensor 1420 at step 1812, the controller 1510 stores the slope m and the offset b from the received digital message in the memory 1518 at step 1814. At step 1816, the controller 1510 calculates the estimated temperature value $Y_{EST}$ using the slope m and the offset b from the received digital message, as well as the calculation period $T_{CALC}$, i.e., $$Y_{EST}=m \cdot T_{CALC}+b. \quad \text{(Equation 19)}$$

The controller 1510 then stores the estimated temperature value $Y_{EST}$ in the memory 1518 at step 1818, before the receive procedure 1800 exits. If the received digital message does not include temperature values received from the temperature sensor 1420 at step 1812, the controller 1510 processes the digital message appropriately at step 1820 and the receive procedure 1800 exits.

FIG. 23 is a simplified flowchart of a temperature estimation procedure 1900 executed by the controller 1510 of the temperature control device 1410 periodically according to an adjustment period $T_{T-ADJ}$ (e.g., one second), such that the temperature estimation procedure 1900 is executed once per second. The controller 1510 updates the estimated temperature value $Y_{EST}$ (with respect to time) at step 1910 using the slope m stored in the memory 1518, i.e., $$Y_{EST}=Y_{EST}+m \cdot T_{T-ADJ}. \quad \text{(Equation 20)}$$

The controller 1510 then controls the HVAC system 1430 using the estimated temperature value $Y_{EST}$, before the temperature estimation procedure 1900 exits.

Alternatively, the temperature control device 1410 could comprise an internal temperature sensing circuit and could be operable to transmit digital messages to the HVAC system 1430 at the variable transmission rate using the methods of the present invention.

While the present invention has been described with reference to the daylight sensor 120 and the temperature sensor 1420, the concepts of the present invention could be applied to sensing devices for other parameters, such as, for example, an energy sensor, a voltage sensor, a current sensor, a battery life sensor, a pressure sensor, a condensation sensor, a humidity sensor, a barometric pressure sensor, a rainfall sensor, or a wind sensor. In addition, the concepts of the present invention could be applied other types of load control devices (other than the dimmer switch 110 and the temperature control device 1410), such as, for example, ballasts for fluorescent lamps; drivers for light-emitting diode (LED) light sources; screw-in luminaires including light sources and integral load regulation circuits; switching devices for turning appliances on and off; plug-in load control devices for controlling plug-in loads; motor control units for controlling a motor loads, such as ceiling fans or exhaust fan; and drive units for controlling a motorized window treatments. As described herein, the variable transmission rate is utilized by wireless sensing devices to conserve battery life, but could be used to reduce the power consumption in other applications, for example, in an energy-harvesting device or in a wall-mounted load control device (such as a dimmer switch) that is adapted to conduct a power supply charging current through an electrical load or through earth ground.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A sensing device for measuring a parameter, the sensing device comprising:
 a sensing circuit operable to generate a control signal representative of a value of the parameter;
 a wireless transmitter for transmitting wireless signals; and
 a controller coupled to the sensing circuit and the wireless transmitter, the controller operable to periodically sample the control signal to generate at least one sampled parameter value;
 wherein the controller is operable to determine at least one predicted parameter value and to calculate an error using the at least one sampled parameter value and the at least one predicted parameter value, the controller operable to transmit a digital message via the wireless signals if the error is too great.

2. The sensing device of claim 1, wherein the controller is operable to determine one or more estimators and to use the one or more estimators to determine the at least one predicted parameter value.

3. The sensing device of claim 2, wherein the controller uses a linear prediction model to calculate the at least one predicted parameter value, the one or more estimators comprising a slope and an offset of a line that best represents the change of the value of the parameter.

4. The sensing device of claim 3, wherein the controller transmits a digital message including the slope and the offset when the error between the at least one sampled parameter value and the at least one predicted parameter value is too great.

5. The sensing device of claim 3, wherein the controller performs a linear least-squares fit on a number of sampled parameter values to determine the slope and the offset of the line that best represents the change of the value of the parameter.

6. The sensing device of claim 2, wherein the one or more estimators comprises a single data point representative of the at least one sampled parameter value.

7. The sensing device of claim 6, wherein the single data point comprises one of a minimum, an average, and a median of a number of sampled parameter values.

8. The sensing device of claim 2, wherein the controller is operable to use a parabolic prediction model to calculate the at least one predicted parameter value, the one or more estimators comprising coefficients of a parabola that best represents the change of the value of the parameter.

9. The sensing device of claim 1, wherein the sensing circuit comprises a photosensitive circuit operable to generate a light intensity control signal representative of a total light intensity in a space around the sensing device.

10. The sensing device of claim 1, wherein the sensing circuit comprises a temperature sensing circuit operable to measure a present temperature in a space around the sensing device and to generate a present temperature control signal representative of the present temperature.

11. The sensing device of claim 1, further comprising:
 a battery for powering the sensing circuit, the wireless transmitter, and the controller.

12. The sensing device of claim 1, wherein the controller is operable to transmit wireless signals using a variable transmission rate that is dependent upon an amount of change of the value of the parameter.

13. The sensing device of claim 1, wherein the sensing device comprises one of: a daylight sensor, a temperature sensor, an energy sensor, a voltage sensor, a current sensor, a battery life sensor, a pressure sensor, a condensation sensor, a humidity sensor, a barometric pressure sensor, a rainfall sensor, and a wind sensor.

14. A load control device for controlling an electrical load powered by an AC power source in a load control system having a sensor for measuring a parameter, the load control device comprising:

a controller for controlling the electrical load; and
a wireless receiver for receiving wireless signals from the sensor;
wherein the controller is operable to decode a present value of the parameter and one or more estimators from the wireless signals received from the sensor, the controller operable to determine at least one estimated parameter value using the present value of the parameter and the estimators, and to control the electrical load in response to the at least one estimated parameter value.

15. The load control device of claim 14, further comprising:
a controllably conductive device adapted to be coupled in series electrical connection between the source and the load;
wherein the controller is operatively coupled to a control input of the controllably conductive device for controlling the power delivered to the electrical load.

16. The load control device of claim 15, wherein the load control device comprises a dimmer switch for adjusting the intensity of the lighting load and the parameter comprises a total light intensity in a space around the sensor, the controller operable to control the controllably conductive device to adjust the intensity of the lighting load in response to at least one estimated value of the total light intensity in the space.

17. The load control device of claim 14, wherein the load control device comprises a temperature control device for controlling a heating and/or cooling system and the parameter comprises a present temperature control signal representative of a present temperature in a space around the sensor, the controller operable to control the heating and/or cooling system in response to at least one estimated value of the present temperature in the space around the sensor.

18. The load control device of claim 14, wherein the one or more estimators comprise a single data point representative of the at least one sampled parameter value.

19. The load control device of claim 14, wherein the one or more estimators comprise a slope and an offset of a line that best represents the change of the value of the parameter.

20. The load control device of claim 14, wherein the one or more estimators comprise coefficients of a parabola that best represents the change of the value of the parameter.

21. A load control system for controlling an electrical load located in a space of a building, the load control system comprising:
a load control device for controlling an electrical load; and
a sensor for measuring a parameter, the sensor operable to transmit wireless signals to the load control device in response to the parameter, the load control device operable to control the electrical load in response to the wireless signals received from the sensor;
wherein the sensor is operable to determine a first predicted value of the parameter and to calculate an error using a present value of the parameter and the first predicted value of the parameter, the sensor operable to transmit wireless signals to the load control device if the error is too great.

22. The load control system of claim 21, wherein the sensor is operable to determine one or more estimators prior to determining the first predicted value of the parameter, the sensor operable to transmit a digital message to the load control device via the wireless signals when the error is too great, the digital message including the present value of the parameter and the one or more estimators, the load control device operable to decode the present value of the parameter and one or more estimators from the wireless signals received from the sensor, the load control device operable to determine a second predicted value of the parameter using the present value of the parameter and the estimators, and to control the electrical load in response to the second predicted value of the parameter.

23. The load control system of claim 22, wherein the one or more estimators comprises a single data point representative of the present value of the parameter.

24. The load control system of claim 22, wherein the sensor and the load control device are each operable to use a linear prediction model to calculate the respective predicted values of the parameter, the one or more estimators comprising a slope and an offset of a line that best represents the change of the value of the parameter.

25. The load control system of claim 22, wherein the sensor and the load control device are each operable to use a parabolic prediction model to calculate the at least one predicted parameter value, the one or more estimators comprising coefficients of a parabola that best represents the change of the value of the parameter.

26. The load control system of claim 21, wherein load control device comprises a dimmer switch for adjusting the intensity of the lighting load and the parameter comprises a total light intensity in a space around the sensor, the load control device operable to adjust the intensity of the lighting load in response to the total light intensity in the space.

27. The load control system of claim 21, wherein the load control device comprises a temperature control device for controlling a heating and/or cooling system and the parameter comprises a present temperature control signal representative of a present temperature in a space around the sensor, the load control device operable to control the heating and/or cooling system in response to the present temperature in the space around the sensor.

28. The load control system of claim 21, wherein the sensor is operable to transmit wireless signals using a variable transmission rate that is dependent upon an amount of change of the value of the parameter.

29. The load control system of claim 21, wherein the sensor comprises one of: a daylight sensor, a temperature sensor, an energy sensor, a voltage sensor, a current sensor, a battery life sensor, a pressure sensor, a condensation sensor, a humidity sensor, a barometric pressure sensor, a rainfall sensor, and a wind sensor.

30. A method of transmitting a digital message in response to a value of a parameter, the method comprising:
generating a control signal representative of the value of the parameter;
periodically sampling the control signal to generate at least one sampled parameter value;
determining at least one predicted parameter value;
calculating an error using the at least one sampled parameter value and the at least one predicted parameter value; and
transmitting a wireless signal if the error is too great.

31. The method of claim 30, wherein the step of determining at least one predicted parameter value comprises determining one or more estimators prior to determining the at least one predicted parameter value, and using the one or more estimators to determine the at least one predicted parameter value.

32. The method of claim 31, wherein the step of determining at least one predicted parameter value further comprises using a linear prediction model to calculate the at least one predicted parameter value, the one or more estimators comprising a slope and an offset of a line that best represents the change of the value of the parameter.

33. The method of claim 32, wherein the step of transmitting a wireless signal comprises transmitting a digital message including the slope and the offset of the line that best represents the change of the value of the parameter when the error between the at least one sampled parameter value and the at least one predicted parameter value is too great.

34. The method of claim 32, wherein the step of determining at least one predicted parameter value further comprises performing a linear least-squares fit to determine the slope and the offset of the line that best represents the change of the value of the parameter.

35. The method of claim 31, wherein the step of periodically sampling the control signal comprises collecting a predetermined number of sampled parameter values during consecutive non-overlapping time intervals, and the step of determining at least one predicted parameter value comprises determining the one or more estimators during a previous time interval, and calculating multiple predicted parameter values using the one or more estimators during a present time interval.

36. The method of claim 35, wherein the at least one estimator comprises a minimum sampled parameter value from the previous time interval, the step of transmitting a wireless signal comprises transmitting a digital message including the minimum sampled parameter value from the present time interval if the difference between the estimator and a minimum sampled parameter value from the present time interval exceeds a maximum error.

37. The method of claim 32, wherein the step of determining at least one predicted parameter value further comprises using a parabolic prediction model to calculate the at least one predicted parameter value, the one or more estimators comprising coefficients of a parabola that best represents the change of the value of the parameter.

38. The method of claim 30, wherein the parameter comprises a total light intensity in a space around the sensor.

39. The method of claim 30, wherein the parameter comprises a present temperature in a space around the sensor.

40. The method of claim 30, wherein wireless signals are transmitted using a variable transmission rate that is dependent upon an amount of change of the value of the parameter.

* * * * *